(12) United States Patent
Sato

(10) Patent No.: US 7,484,207 B2
(45) Date of Patent: Jan. 27, 2009

(54) SOFTWARE EXECUTION CONTROL SYSTEM AND SOFTWARE EXECUTION CONTROL PROGRAM

(75) Inventor: Kenji Sato, Tokyo (JP)

(73) Assignee: O'z Co., Ltd., Osaka (JP)

( * ) Notice: Subject to any disclaimer, the term of this patent is extended or adjusted under 35 U.S.C. 154(b) by 516 days.

(21) Appl. No.: 10/538,764

(22) PCT Filed: Dec. 10, 2003

(86) PCT No.: PCT/JP03/15779

§ 371 (c)(1),
(2), (4) Date: Jun. 10, 2005

(87) PCT Pub. No.: WO2004/053666

PCT Pub. Date: Jun. 24, 2004

(65) Prior Publication Data

US 2006/0117314 A1 Jun. 1, 2006

(30) Foreign Application Priority Data

Dec. 11, 2002 (JP) ............................. 2002-359597

(51) Int. Cl.
*G06F 9/445* (2006.01)
*G06F 9/44* (2006.01)
(52) U.S. Cl. ...................................... 717/174; 717/126
(58) Field of Classification Search ......... 717/168–174, 717/126, 177–178; 709/203
See application file for complete search history.

(56) References Cited

U.S. PATENT DOCUMENTS

| | | | |
|---|---|---|---|
| 5,608,805 A | 3/1997 | Mandell et al. | |
| 5,724,425 A * | 3/1998 | Chang et al. | ................... 705/52 |
| 6,178,551 B1 * | 1/2001 | Sana et al. | ................... 717/140 |
| 6,327,617 B1 * | 12/2001 | Fawcett | ..................... 709/219 |

(Continued)

FOREIGN PATENT DOCUMENTS

JP 8-6784 1/1996

(Continued)

OTHER PUBLICATIONS

Rosenthal et al. "Document Release versus Data Access Controls: Two Sides of the Same Coin?", Oct. 2001, ACM, pp. 544-546.*

(Continued)

*Primary Examiner*—Anil Khatri
*Assistant Examiner*—Anna Deng
(74) *Attorney, Agent, or Firm*—David N. Lathrop, Esq.; Gallagher & Lathrop

(57) ABSTRACT

It is possible to prevent unauthorized use of software such as a game program in download type software distribution for using a program and data by storing them in a user computer in advance. A user downloads a game program of new version (including an accompanying data group) and an execution program from a distribution computer. The execution control program performs authentication by online with an authentication computer and acquires start information required for starting the game program. The execution control program decodes the game program according to the start information and starts it. When the user terminates the game by terminating the game program, the execution control program deletes all or part of the game program so as to incapacitate it.

24 Claims, 13 Drawing Sheets

U.S. PATENT DOCUMENTS

| | | | |
|---|---|---|---|
| 6,453,469 B1* | 9/2002 | Jystad | 717/174 |
| 6,832,373 B2* | 12/2004 | O'Neill | 717/171 |
| 6,889,376 B1* | 5/2005 | Barritz et al. | 717/175 |
| 7,055,067 B2* | 5/2006 | DiJoseph | 714/38 |
| 7,062,765 B1* | 6/2006 | Pitzel et al. | 717/177 |
| 7,069,554 B1* | 6/2006 | Stammers et al. | 717/178 |
| 7,203,745 B2* | 4/2007 | Sheehy et al. | 709/223 |
| 7,222,339 B2* | 5/2007 | Rothman et al. | 717/168 |
| 7,260,557 B2* | 8/2007 | Chavez | 705/59 |
| 2004/0199615 A1* | 10/2004 | Philyaw | 709/220 |

FOREIGN PATENT DOCUMENTS

| | | |
|---|---|---|
| JP | 10-133869 | 5/1998 |
| JP | 2001-84137 | 3/2001 |
| JP | 2002-163578 | 6/2002 |
| JP | 2002-229660 | 8/2002 |
| JP | 2002-351564 | 12/2002 |
| WO | WO 00/72119 A2 | 11/2000 |

OTHER PUBLICATIONS

Kaminsky et al. "Decentralized User Authentication in a Global File System", Oct. 2003, ACM, pp. 60-73.*

* cited by examiner

FIG. 3
(a) STRUCTURE OF GAME PROGRAM
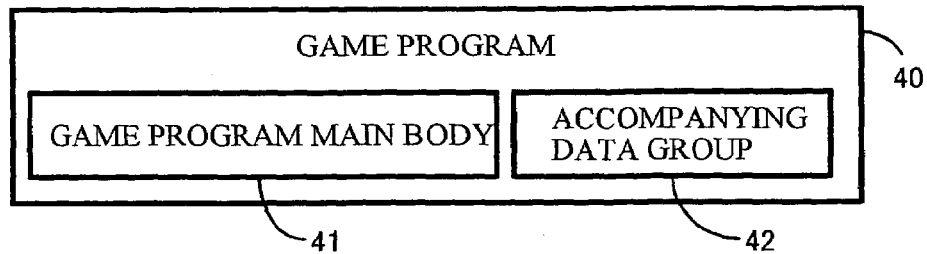
(b) STRUCTURE OF EXECUTION CONTROL PROGRAM
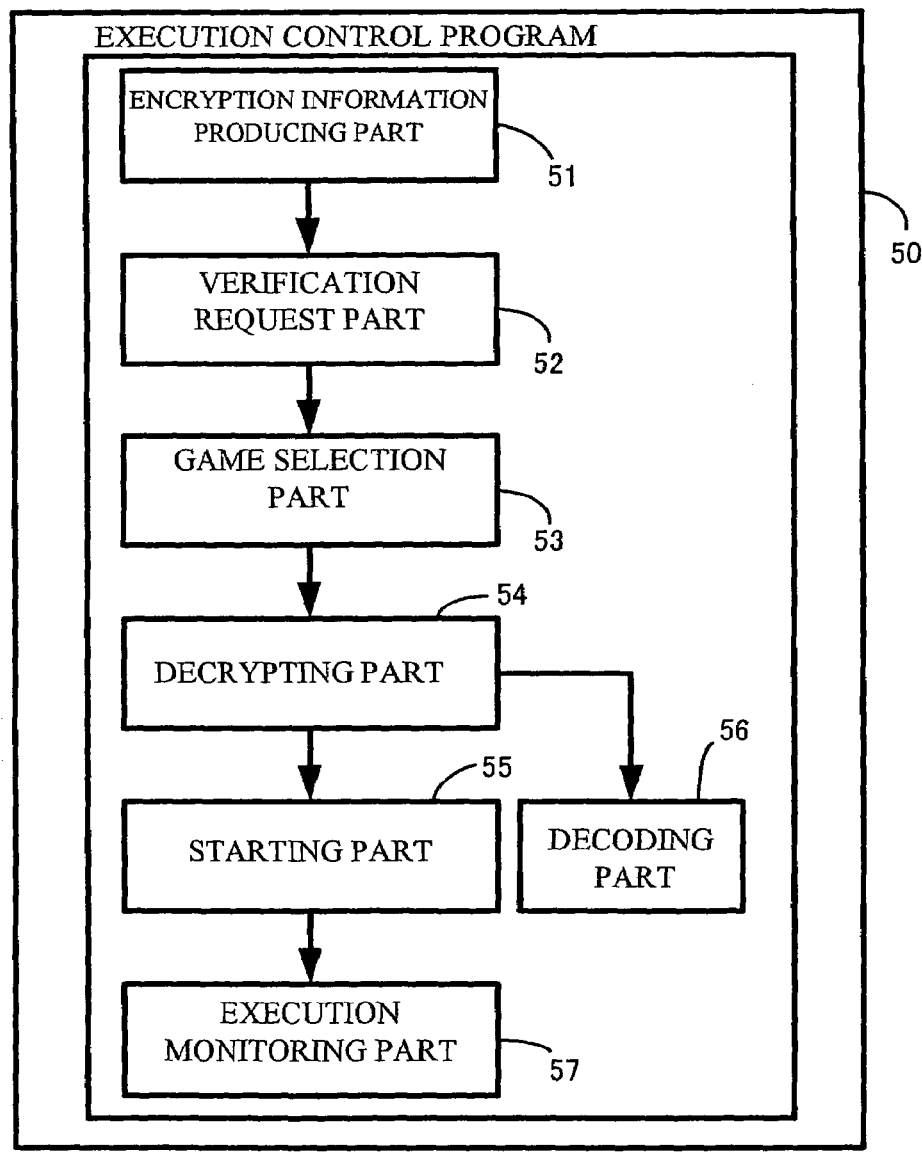

| USER INFORMATION DATA BASE ||||| 
|---|---|---|---|---|
| USER ID | PW | MAC ADDRESS | SESSION ID | OTHER |
| Interlex | Buddy | 00-11-22-33-44-AA | Aaabbbcccddd... | |

(b) 250

| GAME INFORMATION DATA BASE ||||||
|---|---|---|---|---|---|
| GAME ID | GAME NAME | GAME INFORMATION | DECODING KEY | STARTING ARGUMENT | REPORTING MODE |

- FIRST TIME ONLY
- EACH TIME STARTED
- MONITORING PRIORITY
- LOAD REDUCTION (c) 260

| MONITORING CONDITION DATA BASE ||||||
|---|---|---|---|---|---|
| USER ID | REPORTING PERIOD | PLANNED REPORTING TIME | GAME ID | GAME STARTING TIME | OTHER |
| USER 1 | 30 MINUTE INTERVALS | 16:25 | GAME 1 | 13:01 | |
| USER 2 | 40 MINUTE INTERVALS | 16:00 | GAME 2 | 15:20 | |
| USER 3 | 10 MINUTE INTERVALS | 16:00 | GAME 3 | 15:30 | |

SOFTWARE EXECUTION CONTROL SYSTEM AND SOFTWARE EXECUTION CONTROL PROGRAM

TECHNICAL FIELD

The present invention relates to a software execution control system and software execution control program for updating various types of application software such as game software, office software for creating documents and drawings and the like to software of newer versions, and for controlling the execution of such software.

TECHNICAL BACKGROUND

Generally, in the case of application software such as game software or the like that operates in user computers such as (for example) personal computers, portable information terminals or the like, a plurality of different versions are prepared according to various types of software execution environments such the OS (operating system), language use, hardware construction and the like, or according to whether or not there is any software cost, payment of a fee or the like.

For example, even in the case of the same software, different versions may be prepared according to the language that is used, e.g., as in an English language edition, Japanese language addition, Chinese language edition or the like. Furthermore, it is fairly common for a version that is provided free of cost and a version that is provided for a fee to be prepared, and for the user to be induced to upgrade from the free software to the software that is provided for a fee. Such free software is also called a "test edition" or "trial edition", and the software that is provided for a fee is called the "product edition" or "complete edition". Compared to software of the same type that is provided for a fee, free software usually shows a partial limitation of the functions or a restriction on the trial use period or number of times of trial use permitted. Users who recognize the value of the software as a result of such trial use of free software accomplish upgrading of the software version by purchasing the software that is provided for a fee from a web site that provides this software, and downloading the purchased software, or by purchasing packaged software for a fee at a retail outlet.

Meanwhile, since software is digital data and can easily be copied, and since such software is characterized by the fact that such copying causes almost no deterioration in the software, illegal copying and unauthorized use are major problems. Accordingly, it has conventionally been the practice to discriminate by means of user verification or the like between regular users who have purchased the software (software license) and illegal users who have not obtained such a license, and to take steps so that only regular users are allowed to use the software.

For instance, a technique is known in which a product ID that is printed on the software package or recording medium is input when the software is installed, and it is thus ascertained whether or not this software is a regularly purchased product (e.g., see Japanese Patent Application Laid-Open No. 2002-258963, paragraph 0003).

Furthermore, a technique is also known in which key data that is required in order to use the software is requested from a license management server installed on the internet, and the system is devised so that in cases where the user is confirmed as a regular user by user verification, the user can acquire this key data from the license management server, and can start and use the software by means of this key data (e.g., Japanese Patent Application Laid-Open No. 2002-6972, Japanese Patent Application Laid-Open No. 2002-297254).

Conventional techniques that discriminate whether or not a user is a regular user by inputting a product ID (product key) are protective mechanisms that merely input an ID consisting of simple characters or symbols at the time of installation, and are therefore easily circumvented. Accordingly, software that has only a protective mechanism (copyright protection mechanism) of this type cannot in fact exclude illegal copying and unauthorized use.

A technique in which user verification is performed with a license management server, and key data is transmitted to the user computer to start the software in case where a normal verification is made, shows an improved protective power compared to a technique in which a product ID is simply input. However, the software is already placed in a state that allows starting in the user computer, and the user must wait to acquire the key data. Accordingly, if the software that is in a key data waiting state is illegally copied, and the key data is obtained by some other method, the protective mechanism can be circumvented, and the software can be used.

Meanwhile, in recent years, as the processing capacity of computers has increased and communications networks have achieved higher speeds, methods have been proposed for executing desired software at the time desired by users. The streaming system and the downloading system are known as distribution systems that are suitable for such on-demand distribution of software.

In the case of the streaming system, the user computer simultaneously performs playback while receiving software from a server. Then, data that is unnecessary is immediately discarded after this playback is completed. Accordingly, in the streaming system, since no data remains at the point in time at which the inspection by the user is completed, the software cannot be illegally copied without using some special type of software or the like. However, in the case of the streaming system, the software data must be transmitted each time that the user desires to inspect the software; accordingly, even in cases where a broad-area, high-speed communications network is provided, the traffic on the communications network is increased, and the burden on the server is also increased, if numerous users desire streaming distribution at the same time.

In the case of the downloading system, on the other hand, software that is desired by a user is downloaded from a server and accumulated in the user computer, and this software is executed in the user computer; accordingly, the time for which the data is flowing through the communications network is short, and distribution requests from numerous users can be handled. In the case of the downloading system, however, software remains as downloaded in the user computer; accordingly, illegal copying and the like can be performed more easily than in the case of the streaming system.

Furthermore, for example, it is a widespread practice for game programs and the like to be placed in circulation in a form in which these programs are fixed on various types of recording media such as CD-ROMs, DVD-ROMs, hard disks, semiconductor memories and the like. In such cases as well, game programs and the like are improperly copied, protective mechanisms are improperly destroyed, and the programs are improperly used, as was described above.

DISCLOSURE OF THE INVENTION

Accordingly, it is one object of the present invention to provide a software execution control system and software execution control program which are devised so that this system and program can suppress the improper use of software.

Furthermore, it is one object of the present invention to provide a software execution control system and software execution control program which are devised so that in the case of a downloading system that stores and executes software in a user computer, illegal copying and unauthorized use can be prevented.

Furthermore, it is one object of the present invention to provide a software execution control system and software execution control program which are devised so that the improper use of software during execution can be prevented beforehand.

Furthermore, it is one object of the present invention to provide a software execution control system and software execution control program which can actively control the monitoring efficiency with respect to improper use while taking into account the load conditions and the like.

Other objects of the present invention will become clear from the description of embodiments given below.

The software execution control system of the present invention is a system which updates first software that is installed in a user computer to second software; this system comprises a distribution part and verification part described later, and uses an execution control program which performs an operation that is characteristic of the present invention.

The distribution part is a part that distributes encoded second software and an execution control program for controlling the execution of this second software to the user computer via a communications network. The verification part is a part that performs user verification by means of a request from the execution control program installed in the user computer, and that transmits specified information that is required in order to decode and start the second software to the control execution program via the communications network in cases where it is confirmed that the user is a valid user. Furthermore, the second software is constructed so that this software can be started only by the starting information that is transferred from the execution control program, and the execution control program is constructed so that (1) the encoded second software is decoded on the basis of specified information received from the verification part, and is substituted for the first software, (2) the second software is started by creating starting information on the basis of specified information, and (3) the second software is disabled when the execution of the second software is completed.

The first software and second software are software of the same type, but of different versions. The first software may also be called old edition software, and the second software may also be called new edition software. For example, various types of application software such as games, movies, musical programs, cultural programs, educational programs, document preparation programs, graphics preparation programs, image editing programs and the like can be used as the first and second software. For example, the first software and second software differ in terms of the language used, the environment in which execution is possible (corresponding OS or the like), presence or absence of functional limitations and the like. Examples of user computers that can be used include workstations, personal computers, portable information terminals, portable telephones and the like.

Initially, the first software that has been installed in the user computer can be freely used by the user without performing the verification processing and the like described later. For example, the first software is installed in the user computer via a communications network such as the internet or the like from a software vendor site, or by means of packaged software from a retail outlet.

Next, if the user wishes to download the second software from the distribution part, the second software and an execution control program that controls the execution of the second software are transmitted to the user computer from the distribution part. The execution control program is executed in the user computer. The execution control program requests user verification from the verification part via the communications network. In regard to the method used for user verification, for example, this can be accomplished by making a comparison with a user ID, password, or data in which information that is specific to the user computer (e.g., MAC address (medial access control address) or the like) is registered beforehand. Furthermore, the system is not limited to these examples; for instance, verification can also be performed using biological information that is specific to the user, such as fingerprints, voice prints or the like.

In cases where the verification part verifies that the user is a valid user, specified information is transmitted from the verification part to the execution control program of the user computer. This specified information contains data that is required in order to decode the second software that is transmitted to the user computer in an encoded state, and in order to start the decoded second software.

Here, the second software is constructed so that this software can be started only by the starting information transferred from the execution control program. Specifically, the execution control program acts as dedicated "launcher software" that starts the second software.

Furthermore, the execution control program performs the following processing. (1) First, on the basis of specified information received from the verification part (i.e., utilizing a decoding key contained in this specified information), the execution control program decodes the second software. The decoded second software is substituted for the first software. (2) Next, on the basis of specified information received from the verification part (i.e., utilizing a starting argument contained in this specified information), the execution control program creates starting information (a starting statement consisting of a starting argument and the registry path for the decoded second software), and starts the second software by means of this starting information. As a result, the user can use the second software in the user computer. (3) Even after the second software is started, the execution control program monitors the conditions of execution of the second software, and disables the second software when the completion of the execution of the second software is detected. As a result, the user becomes unable to use the second software.

In cases where the user wishes to use the software again, the user must again undergo verification by the user verification part, and acquire specified information. Alternatively, the user computer may again be caused to access the distribution part, so that the user computer again downloads the second software. It is not necessary to download all of the second software again; if the system is constructed so that only the program part is downloaded again, the communications time can be shortened, so that traffic can be reduced. Furthermore, it is desirable that the specified information that is transmitted to the user computer from the verification part be encrypted.

When the execution of the second software is completed, the execution control program disables the second software. This disabling refers to a process that makes it impossible to start or execute the second software. Various methods can be used as disabling methods. For example, disabling can be accomplished by deleting all of the decoded second software.

Furthermore, in cases where only a portion of the software is disabled, the second software can be restarted by receiving the deleted portion and the starting argument from the verification part. Alternatively, in cases where the second software includes a program and an accompanying data group, the second software can be disabled by deleting only the program. Furthermore, if the encoded data prior to decoding is stored, the second software can be restarted merely by receiving specified information from the verification part. The term "accompanying data group" refers to a data group other than the program that is used in the execution of the above mentioned program; examples of such data include image data, voice data, musical data, text data and the like.

In a preferred embodiment, the execution control program is constructed so that this program can handle a plurality of different types of second software, and the specified information that is transmitted to the execution control program by the verification part includes storage destination address information and a starting argument for the second software that is to be started, and decoding key data for decoding the second software.

The execution control program that controls real-time on-line verification via the communications network and the starting and completion of the second software is created separately from the second software. Accordingly, numerous different types of second software can be handled merely by preparing a single type of execution control program.

In a preferred embodiment, the execution control program transmits verification information including machine information that is specific to the user computer and encrypting key into to the verification part, the verification part performs user verification on the basis of at least this machine information, and in cases where it is confirmed that the user is a valid user, the verification part encrypts the specified information with the encrypting key information and transmits this specified information to the execution control program via the communications network; furthermore, the system is constructed so that a plurality of sets of machine information can be registered in the verification part.

For example, machine information that is specific to the user computer may include MAC addresses or the like. In addition, user computer construction information (e.g., amount of memory installed, CPU specifications, sound chip and graphic accelerator product names and the like) may also be used. A plurality of types of machine information can be registered in the verification part. As a result, users who have properly purchased the second software can utilize the same second software using a plurality of user computers such as home personal computers, workplace personal computers and the like.

In a preferred embodiment, in cases where the verification part has confirmed that the user is a valid user, the verification part transmits second software list data that can be started by the user to the user computer, and transmits specified information relating to the second software selected from the list data to the execution control program via the communications network.

There may also be cases in which the user has formally purchased licenses for a plurality of different types of second software; in such cases, following user verification, the verification part transmits list data showing examples of the names or the like of second software that can be utilized by the user to the user computer. The user selects second software that he wishes to start from the list menu showing software that can be started (i.e., that can be utilized). As a result, the verification part creates specified information for decoding and starting the selected second software, and transmits this specified information to the execution control program.

In a preferred embodiment, the execution control program causes a function which acquires machine information that is specific to the user computer, a function which creates encrypting key information, a function which requests user verification from the verification part, and which transmits at least machine information and encrypting key information to the verification part, a function which allows the user to select one set of second software from the list data of startable second software that is received from the verification part, and which notifies the verification part of the selected second software, a function which receives specified information in which storage destination address information for the selected second software in the user computer, a starting argument and decoding key information are encrypted by means of at least encrypting key information, a function which decrypts the encrypted specified information using at least the encrypting information, a function which decodes the second software in the user computer by means of the decrypted decoding key information, a function which creates starting information on the basis of the decrypted starting argument and storage destination address information, a function which starts the decoded second software by means of the created starting information, and a function which monitors the conditions of execution of the started second software, and disables the second software when the execution of the second software is completed, to be realized in the user computer.

Furthermore, in a preferred embodiment, the second software contains a program and an accompanying data group, and at least one of these, i.e., the program or accompanying data group, is updated.

Here, the first software that is installed in the user computer can be executed without receiving verification by means of the verification part until this first software is replaced by the second software.

Furthermore, in a preferred embodiment, the execution control program is constructed as a program that cannot be forcibly ended separately from the second software.

Specifically, for example, the execution control program can be constructed so that the execution control program alone cannot be forcibly ended using a program that manages tasks in operation or the like. This is done so that monitoring by the execution control program cannot be stopped and the second software alone copied or the like. More concretely, if the execution control program is created as a device driver that does not designate hardware (since hardware is not designated, this is not strictly a device driver), since this program is constructed as a program that is closer to the OS side than an application program, or as a program that forms a part of the OS, it is difficult to forcibly end this program as in the case of an ordinary application program. In addition to driver programs, BIOS (basic input/output systems) are also known as programs that are difficult to end forcibly. However, since BIOS basically have only the function of directly transmitting and receiving data with hardware, such BIOS cannot perform a high degree of control such as decrypting encrypted data, monitoring the execution of the above mentioned second software or the like. Thus, for example, by constructing the execution control program as an intermediate program that is positioned between the OS and application program (second software) as in the case of a device driver, it is possible to prevent misuse while causing a high degree of processing to be performed.

In a preferred embodiment, the distribution part and verification part are realized in respectively separate computers.

For example, the distribution part that distributes the second software and execution control program can be installed for each software firm, and the verification part that performs verification at the time of starting of the second software can be installed for each country, each region or each group of software firms.

The present invention can also be grasped as the invention of a program.

Specifically, this is an execution control program which updates the first software installed in the user computer to the second software, and controls the execution of this second software, and is a software execution control program which causes a first function that communicates with an outside verification part via a communications network, and that requests user verification, a second function that creates starting information for starting the second software on the basis of specified information received from the verification part, a third function that decodes the second software on the basis of specified information received from the verification part, a fourth function that replaces the pre-updating software already installed in the user computer with the decoded second software, a fifth function that starts the second software by means of the created starting information, and a sixth function that monitors the conditions of execution of the second software, and that disables the second software when the execution of the second software is completed, to be realized in the user computer.

Furthermore, the present invention can also be grasped as a software updating method.

Specifically, this is a software updating method comprising the steps of notifying the user that the freely usable first software installed in the user computer can be updated to the second software, connecting the user computer via a communications network to a distribution computer that distributes the second software, and requesting updating to the second software, transmitting the encoded second software and an execution control program for controlling the execution of this second software from the distribution computer to the user computer via a communications network, connecting the user computer and verification computer via the communications network and requesting user verification from the verification computer by means of the execution control program started in the user computer, decoding the second software on the basis of specified information transmitted to the user computer from the verification computer in cases where the user is confirmed as a valid user by user verification, creating starting information for starting the second software on the basis of specified information received from the verification computer, starting the second software by means of the created starting information, and monitoring the execution of the second software and disabling the second software when the execution of the second software is completed.

The management computer according to another aspect of the present invention controls the operation of the execution control program by performing communications with the execution control program which is installed in the user computer together with the application software and monitoring program. Furthermore, this management computer comprises a verification part which performs user verification on the basis of requests from the execution control program, an information transmission part which transmits first information that is required for the execution control program to start the application software in cases where it is confirmed by the verification part that the user is a valid user, and a continuing execution management part which manages whether or not continuation of the execution of the application software is allowed on the basis of continuation confirmation communications performed with the execution control program at a specified time.

In one aspect of the present invention, the continuing execution management part compares first identification information acquired by continuation confirmation communications and second identification information associated beforehand with user verification, and in cases where both sets of identification information correspond, the continuing execution management part allows the execution control program to continue execution of the application software, while in cases where the respective sets of identification information do not correspond, the continuing execution management part prohibits the execution control program from continuing the execution of the application software.

In one aspect of the present invention, the continuing execution management part sets first identification information corresponding to the second identification information in the execution control program beforehand.

In one aspect of the present invention, the continuing execution management part sets a specified time in the execution control program beforehand, and when this preset specified time arrives, continuation confirmation communications are caused to take place from the execution control program to the continuing execution management part.

In one aspect of the present invention, the continuing execution management part can set the specified time in a variable manner.

In one aspect of the present invention, the continuing execution management part can set the specified time in a variable manner while taking into account at least the predicted future load conditions.

In one aspect of the present invention, the monitoring program respectively monitors the operating conditions of the application software and the execution control program, and in cases where either the application software or the execution control program stops operating, the monitoring program respectively shuts down the application software and the execution control program, and also shuts itself down; furthermore, the execution control program respectively monitors the operating conditions of the application software and the monitoring program, and in cases where the application software or monitoring program stops operating, the execution control program respectively shuts down the application software and the monitoring program, and also shuts itself down.

The computer program according to still another aspect of the present invention is a program which causes a computer to function as an execution control part that controls the execution of application software, and a monitoring part that respectively monitors the operating conditions of the application software and execution control part, the execution control part comprises a function which requests user verification by communicating with the management computer, a function which starts the application software on the basis of first information received from the management computer, a function which performs continuation confirmation communications with the management computer, and a function which shuts down the operation of the application software in cases where continuation of the execution of the application software is prohibited by the continuation confirmation communications, and the monitoring part comprises a function which respectively monitors the operating conditions of the application software and the execution control part, and a function which respectively shuts down the application software and the execution control part, and which also shuts itself down, in cases where either the application software or the execution control part stops operating.

BRIEF DESCRIPTION OF THE DRAWINGS

FIG. 3 shows the schematic structures of programs, with FIG. 3(a) showing a game program, and FIG. 3(b) showing the structure of the execution control program;

FIG. 8 shows the structures of the data bases and the like, with FIG. 8(a) showing a user information data base, FIG. 8(b) showing a game information data base, and FIG. 8(c) showing a monitoring condition data base;

BEST MODE FOR CARRYING OUT THE INVENTION

Embodiments of the present invention will be described in detail below with reference to FIGS. 1 through 13.

Figure 1:
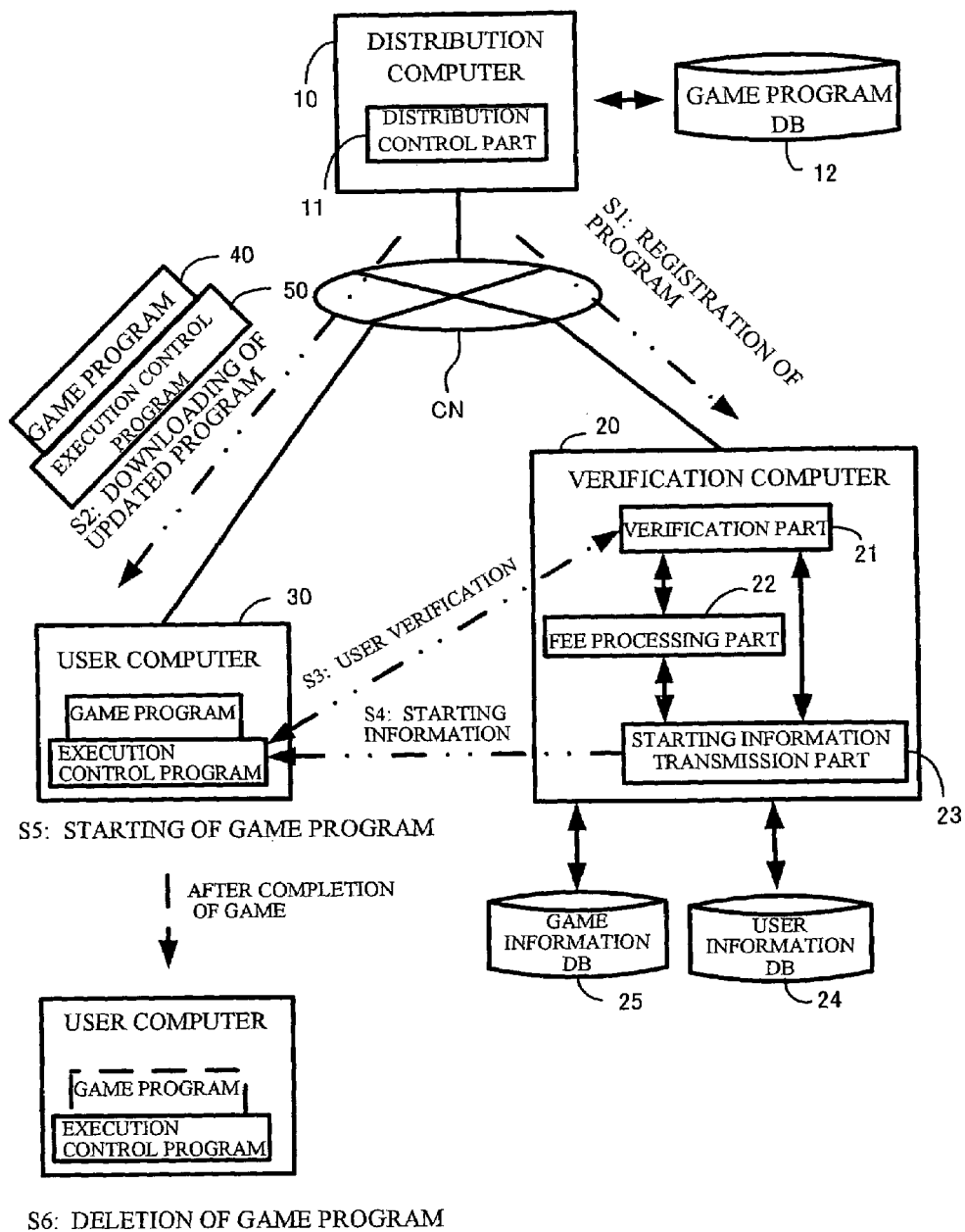
FIG. 1 is an explanatory diagram showing an overall outline of a software execution control system constituting an embodiment of the present invention.

First, a first embodiment will be described with reference to FIGS. 1 through 6. FIG. 1 is an explanatory diagram which shows an overall outline of the software execution control system. In the present embodiment, a system in which a game program is updated on-line will be described as an example.

The distribution computer 10 distributes a new edition of a game program 40 and an execution control program 50 to respective user computers 30 via a communications network such as the internet or the like. The distribution computer 10 can be constructed as a server which is respectively installed for each software firm (vendor).

First, for a new edition program registered in the game program data base 12, the distribution computer 10 performs registration in the verification computer 20 in advance (S1). For example, data such as the name, type, retail price, data size, version information and the like for a new edition game program is registered in the verification computer 20 from the distribution computer 10. Of course, in cases where the distribution computer 10 and verification computer 20 are constructed as an integral unit, such notification via an external network is not absolutely necessary.

When the distribution control part 11 of the distribution computer 10 receives a program updating request from the user computer 30, this distribution control part 11 reads out the game program 40 desired by the user from the game program data base 12, and distributes this program to the user computer 30 (S2). Here, it should be noted that the new edition of the game program 40 is not distributed to the user computer 30 alone, but is rather distributed to the user computer 30 together with the execution control program 50 that manages the starting, deletion and the like of the game program 40.

For example, the verification computer 20 can be constructed as a server that is respectively installed for each group or organization to which the software firm belongs. Furthermore, the present invention is not limited to this; verification computers 20 may also be installed for each software firm. The verification computer 20 comprises a verification part 21, a fee processing part 22, a starting information transmission part 23, a user information data base 24, and a game information data base 25.

The verification part 21 is a part which performs user verification on the basis of specified verification data transmitted from the execution control program 50 of the user computer 30. Details will be described later; however, the user verification data includes user identification information (a user ID), a password (PW), a MAC address (media access control address) and the like.

The fee processing part 22 is a part which charges the user a fee when permission to use the updated game program 40 is given. Various methods may be used as the method of levying a fee. For example, the user may be asked to pay a fee for the game program at one time (purchase of the program), or the user may pay a fee each time that he uses the program. Alternatively, the system may be devised so that a fee is charge at a specified period or for a specified number of times of use. Furthermore, various payment methods such as payment by credit card, payment by electronic money order or the like may be used.

The starting information transmission part 23 transmits starting information that is necessary in order to decode and start the new edition of the game program 40 stored in a storage device (e.g., hard disk or the like) of the user computer 30 to the execution control program 50 of the user computer 30.

The user undergoes verification with the verification part 21 of the verification computer 20 via the execution control program 50, and in cases where it is verified that the user is a valid user who has paid the purchase price (or use fee) of the game program 40 (S3), the starting information is transmitted to the execution control program 50 from the starting information transmission part 23 (S4). In cases where a user who has not yet paid the fee for the game program 40 accesses the verification computer 20, the starting information is transmitted to the execution control program 50 after fee processing is performed via the fee processing part 22.

Now turning our attention to the construction of the user computer 30, this user computer 30 is constructed (for example) as a computer such as a personal computer, workstation, portable information terminal, portable telephone or the like. The user computer 30 comprises (as necessary) computer resources such as a calculation processing unit (CPU), main memory, auxiliary memory, external input-output circuit and the like, and these respective resources are appropriately used by the game program 40 and execution control program 50.

The new edition of the game program 40 and the execution control program 50 that are transmitted to the user computer 30 from the distribution computer 10 are installed in the user computer 30 by an accessory installer (as will be described later). Furthermore, the execution control program 50 performs user verification with the verification computer 20, and when the starting information is input, the game program 40 is started (S5). Furthermore, since the old edition of the game program that was already installed in the user computer prior to the installation of the new edition of the game program 40 is replaced by the new edition of the program, the old edition of the game program 40 cannot subsequently be used.

The user can utilize the new edition of the game program 40 via the user computer 30. Furthermore, when the user finishes the game and completes the game program 40, the execution control program 50 disable the game program 40 by deleting the game program 40 or the like (S6). In cases where the user again utilizes the game program 40, the user again accesses the verification computer 20, undergoes user verification, and acquires starting information.

Here, since the new edition of the game program 40 is stored as an encrypted file prior to decoding in the storage device of the user computer 30, in cases where the game program 40 is to be reused, it is necessary merely to acquire information that is used for the decoding of this encrypted file (i.e., a decoding key) and information that is used for the starting of the program from the verification computer. Specifically, in the present embodiment, the new edition of the game program 40 is stored as an encrypted file on the local disk of the user computer 30, and each time that the game is played, on-line verification is performed with the verification computer 20, and the encrypted game program 40 is decoded and started. Then, after the game is finished, the decoded game program 40 is disabled by being deleted.

Figure 2:
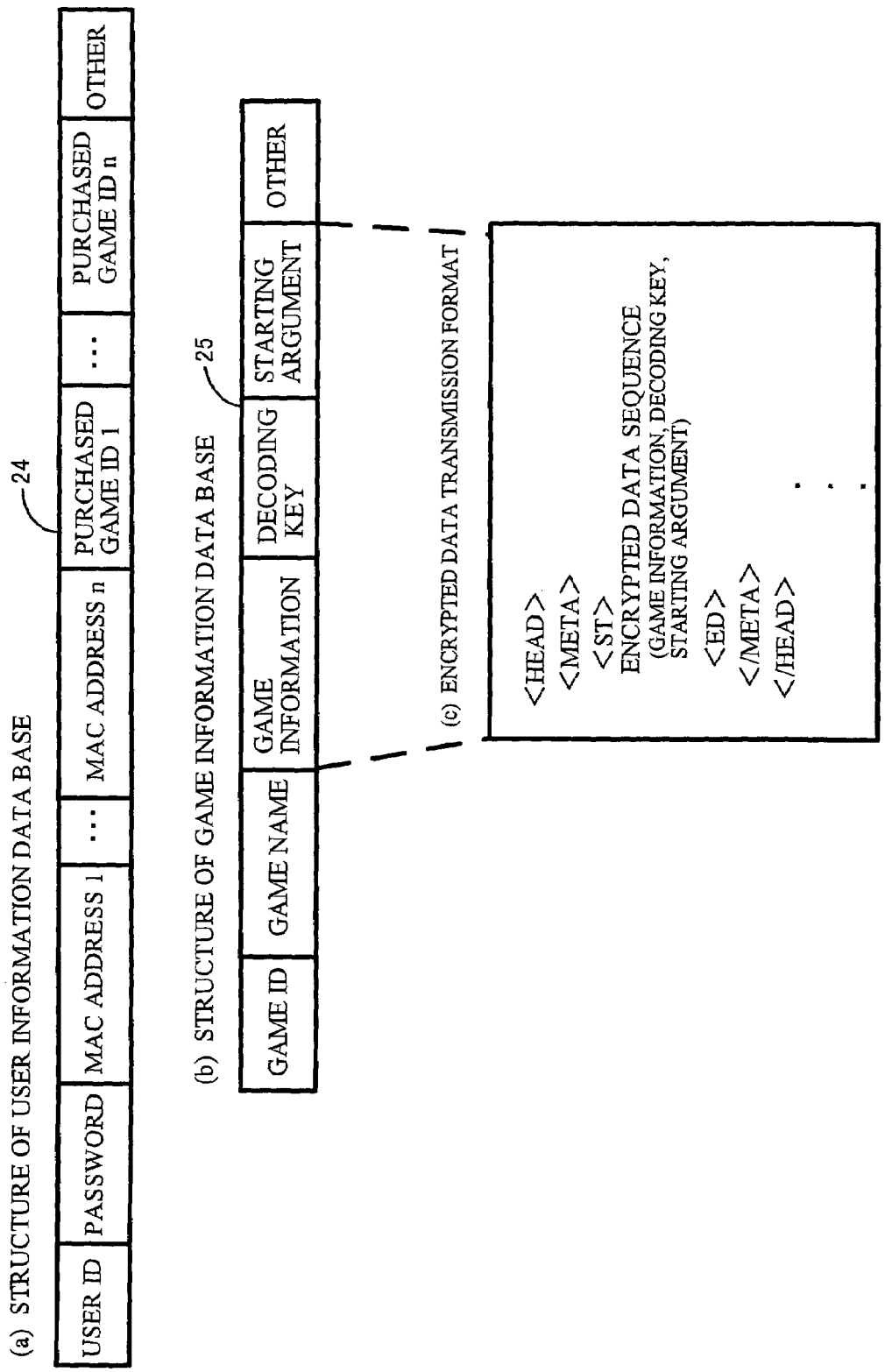
FIG. 2 shows the structures of the data bases and the like, with FIG. 2(a) showing a user information data base, FIG. 2(b) showing a game information data base, and FIG. 2(c) showing how encrypted starting information is embedded in the HTML header and transmitted.

Next, FIG. 2 is an explanatory diagram showing examples of construction of the user information data base 24 and game information data base 25 used by the verification computer 20. Furthermore, the contents of the respective data bases 24 and 25 shown in FIG. 2 are merely examples; it is not necessary that all of the items shown in the figure be provided.

For example, the user information data base 24 shown in FIG. 2(*a*) is constructed by respectively associating the user ID, password, a plurality of MAC addresses 1 through n, game IDs 1 through n that specify the purchased game programs, and other information. Here, the reason that the system is devised so that a plurality of MAC addresses 1 through n can be registered is that cases in which a single user uses a game program 40 by using a plurality of different user computers 30 are also taken into account. Accordingly, for example, the user can utilize the game program 40 via different information processing terminals such as a workplace computer, home computer and the like. Examples of other information that can be used include the user's name, age and address, the number of times that the game is played, the number of points scored (e.g., in cases where points are awarded in accordance with the game purchase price, number of times played or the like) and the like.

Furthermore, for example, the game information data base 25 shown in FIG. 2(*b*) is constructed by associating the game ID, name of the game, game information (information indicating the registry path of the game program), decoding key that is used to decode the encrypted game program 40, starting argument that is used to start the decoded game program 40, and other information. Examples of other information that can be used include the type of the game (role playing game, combat game, presence or absence of designation for adults or the like), data size, copyright management information and the like.

As is shown in FIG. 2(*c*), the game information, decoding key and starting argument are embedded in encrypted HTML (hyper text markup language) data, and are transmitted to the user computer 30. Specifically, the starting information (game information, decoding key, starting argument) is encrypted by means of an encrypting key and MAC address created on the side of the user computer 30, and is embedded in (for example) the HTML header part. Accordingly, in response to an HTTP (hyper text transport protocol) request from the user computer 30, the verification server 20 creates encrypted starting information, and returns an HTTP response containing this encrypted starting information to the user computer 30.

Next, FIG. 3 is an explanatory diagram which shows the schematic construction of the game program 40 and the execution control program 50.

As is shown in FIG. 3(*a*), the game program 40 includes a program proper 41 and an accompanying data group 42. Examples of data in the data accompanying group 42 include movie data, still image data, graphics data, musical data, voice data, text data and the like.

In the new edition of the game program 40, compared to the old edition of the program, either the program proper 41 or the accompanying data group 42, or both, are newly created. In cases where both the program proper 41 and the accompanying data group 42 are newer than in the old edition, both the program proper 41 and accompanying data group 42 are replaced by new editions. In cases where only the accompanying data group 42 is new or in cases where only the program proper 41 is new, either the accompanying data group 42 or the program proper 41 is replaced by a new edition.

As is shown in FIG. 3(*b*), the execution control program 50 causes the respective functions of an encryption information producing part 51, a verification request part 52, a game selection part 53, a decryption part 54, a starting part 55, a decoding part 56 and an execution monitoring part 57 to be realized in the user computer 30. As one example, the execution control program 50 is constructed as a device driver that specifies the device. Accordingly, for example, the execution control program 50 differs from application programs such as game programs or the like in that this execution control program can be constructed so that this program cannot be ended from a task management program or the like.

For example, besides creating an encrypting key on the basis of time information acquired from an internal timer in the user computer 30, the encryption information producing part 51 acquires MAC addresses and the like of the user computer 30.

The verification request part 52 internally calls up the network access function mounted in the user computer 30, accesses the verification computer 20, transmits the encrypting key, MAC address, user ID and password to the verification computer 20, and requests user verification.

The game selection part 53 allows the user to selected desired games from a list menu that is transmitted to the user computer 30 from the verification computer 20 after user verification is completed. This list menu displays the game programs that can be utilized (started) by the user in a list format, and can be created on the basis of purchased game IDs in the user information data base 24.

The starting information that is used to start the game program 40 selected by the user in accordance with the MAC address and the encrypting key created by the encryption information producing part 51 is encrypted and transmitted to the user computer 30. The decryption part 54 decrypts the encrypted starting information on the basis of the encrypting key and MAC address.

The decoding part 56 decodes the encrypted game program 40 by means of the decrypted decoding key. Furthermore, the encrypted file is stored "as is". The starting part 55 creates a starting statement and starts the decoded game program 40 on the basis of the decoded game information and starting argument. The starting statement is constructed from the registry path and starting argument of the game program.

When the game program 40 is started, the execution monitoring part 57 monitors the conditions of execution of the game program 40, and when the game program 40 ends, the decoded program proper 41 is deleted. Furthermore, the decoded accompanying data group may also be deleted along with the game program proper 41. Furthermore, when this deletion is performed, all of the program or data may be deleted, or a portion of the program and data may be deleted.

Figure 4:
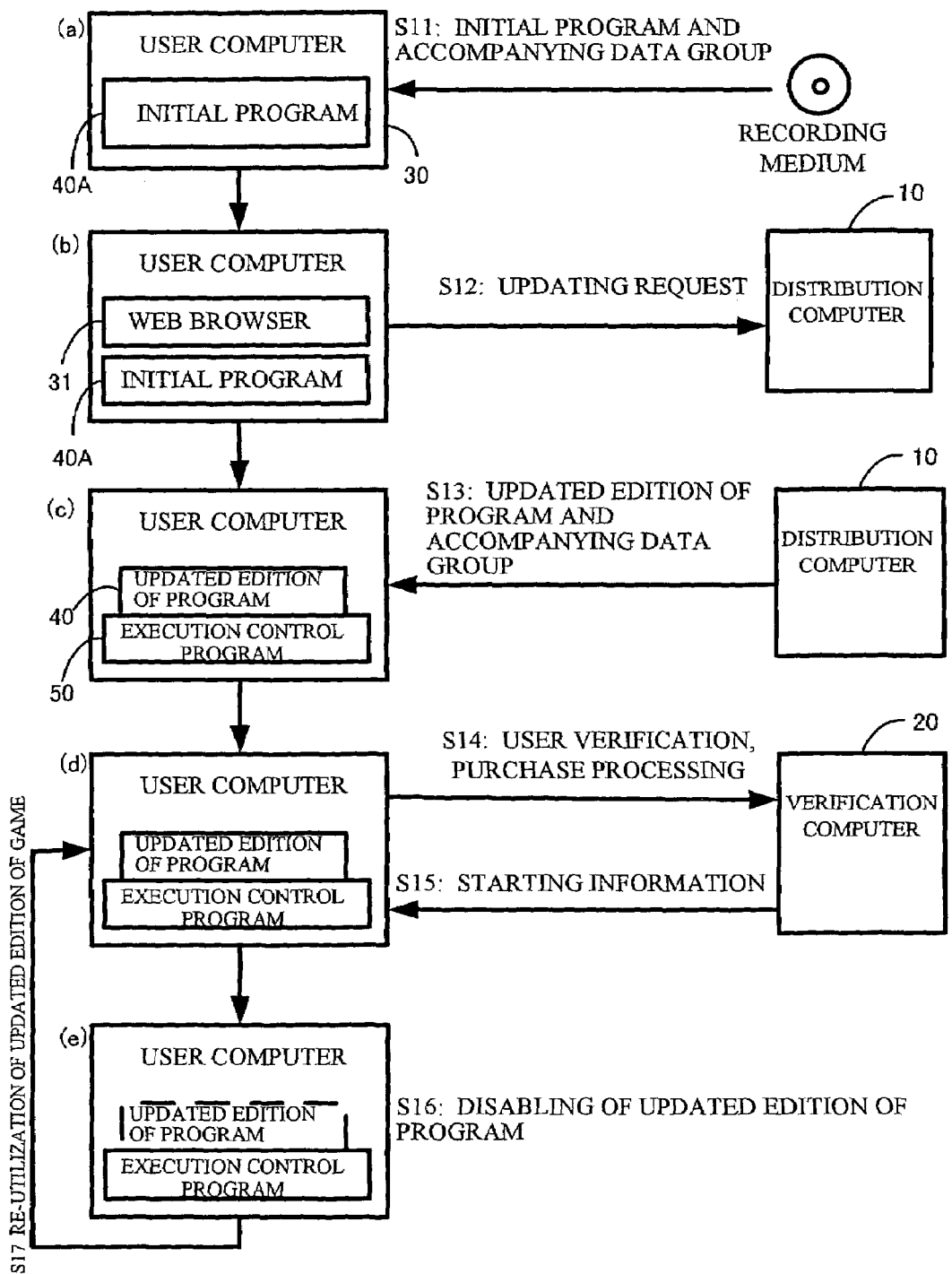
FIG. 4 is an explanatory diagram showing how an old edition of a game program installed in the computer is updated to a new edition of this game program, and how the starting of this program is controlled.

Next, FIG. 4 is an explanatory diagram which shows in model form how the game program is updated to the most recent edition by the present system.

First, as is shown in FIG. 4(*a*), the old edition of the game program has already been installed in the user computer 30. Moreover, in the figures, the old edition of the game program prior to upgrading of the version is indicated as the "initial program", and the new edition of the game program whose version is upgraded is indicated as the "updated edition of the program".

For example, the user installs the old edition of the game program 40A which is fixed on a storage medium such as a CD-ROM, DVD-ROM, memory or the like in the user computer 30, and utilizes this program (S11). Alternatively, the user may also acquire the old edition of the game program 40A via a communications network such as the internet or the like. This old edition of the game program 40A can be used without undergoing on-line verification with the verification computer 20. However, once updating has been performed by the present updating system, utilization is impossible without undergoing on-line verification even in cases where the updated edition of the program is the old system.

The user utilizing the old edition of the game program 40A is notified that updating to the new edition of the game program 40 is possible. This notification can be performed by various methods.

For example, the first method is a method in which the user is informed, either actively or passively, that the old edition of the game program 40A can be updated to the new edition of the game program 40, and at the same time, the URL (uniform resource locator) of the distribution computer 10 is displayed. As active notification, for example, it is conceivable that the fact that updating is possible might be displayed on the screen along with the URL at the time that the game is started or at the time that the game is ended. As passive notification, for example, it is conceivable that the fact that updating is possible might be displayed along with the URL of the distribution computer in the help menu for the old edition of the game program. In either case, a system that is convenient for the user can be obtained by constructing the system so that the web browser 31 is started and the user computer 30 is automatically caused to access the distribution computer merely by clicking on the URL.

The second method is a method in which the user is notified either actively or passively of the fact that updating to the new edition of the game program is possible, along with the URL of the distribution computer 10, via an electronic medium. For instance, an email that is addressed to the user can be cited as an example of active notification. Furthermore, for instance, advertising of the new edition of the game program 40 by means of a web site (for example, the distribution computer 10 or the like) is conceivable as an example of passive notification.

In addition, advertising via a paper medium such as a game magazine, computer magazine or the like, or advertising to the community as in a game program fan society formed on network, is conceivable as a third method.

Thus, the user can be notified of the existence of the new edition of the game program 40. As is shown in FIG. 4(*b*), a user who desires updating accesses the distribution computer 10 via the web browser 31, and requests updating to the new edition of the game program 40 (S12).

As is shown in FIG. 4(*c*), the distribution computer 10 transmits the new edition of the game program 40 (including the accompanying data group as well) desired by the user to the user computer 30 via the communications network (S13). Furthermore, the execution control program 50 is also formed into a set together with the new edition of the game program 40, and is transmitted to the user computer 30 (S13). The new edition of the game program 40 and the execution control program 50 are stored in the storage device of the user computer 30.

A dedicated installer is attached as an accessory to the new edition of the game program 40 and the execution control program 50. The new edition of the game program 40 the execution control program 50 are installed in the user computer 30 by means of this installer. When the execution control program is started, as is shown in FIG. 4(*d*), the execution control program 50 calls up a network access function, accesses the verification computer 20, and performs user verification and purchase processing (fee processing) with the verification computer 20 (S14). After this user verification and fee processing are completed, the verification computer 20 transmits encrypted starting information to the execution control program 50 of the user computer 30 (S15).

The execution control program 50 decrypts the encrypted starting information, and extracts the decoding key, starting argument and the like. Then, the execution control program 50 decodes and starts the game program 40. The conditions of execution of the game program 40 are monitored by the execution control program 50.

As is shown in FIG. 4(*e*), when the user finishes playing the game, and the game program 40 ends, the execution control program 50 disables the new edition of the game program 40 by deleting this program (S16).

As one example, only the new edition of the game program 40 that has been decoded and placed in a state that allows execution (a state that allows starting by the input of the starting statement); here, the encrypted file (prior to decoding) that is acquired from the distribution computer 10 can be stored "as is" in the storage device of the user computer 30.

As a result, in cases where the user wishes to play the game program 40 again, the user need merely access the verification computer 20, undergo on-line user verification, and again acquire starting information from the verification computer 20 (S17). Since there is no need to re-acquire the encrypted game program 40 from the distribution computer 10, the trouble of downloading can be avoided, and the burden on the communications network can be reduced.

A method in which only the starting information of the game program 40 is thus re-acquired in cases where the game program 40 is to be played again is convenient. However, the present invention is not limited to such a method; it would also be possible to devise the system so that the encrypted program prior to decoding is re-acquired from the distribution computer 10. Furthermore, it would also be possible to delete only the decoded program proper 41, and to leave the accompanying data group 42 "as is".

Next, details of the processing of the present system will be described with reference to FIGS. 5 and 6. The flow charts shown in the figures indicate the rough flow of the processing, and differ from the actual programs.

Figure 5:
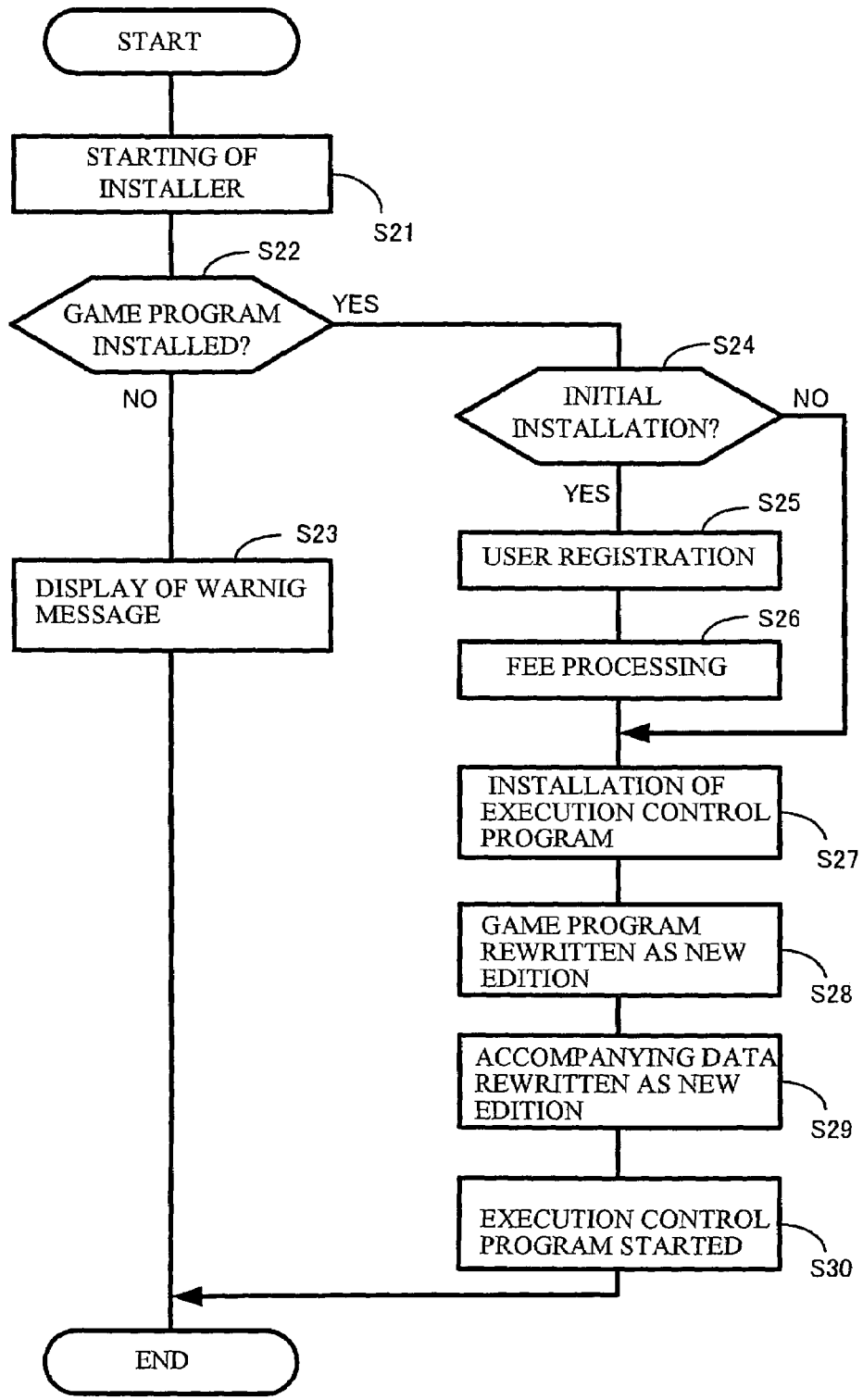
FIG. 5 is a flow chart showing the processing that is performed when a game program and an execution control program are installed.

FIG. 5 shows the processing used for the installation of the installation of the new edition of the game program 40 and execution control program 50 stored in the storage device of the user computer 30 and the like.

The game program 40 and execution control program 50 are stored in the user computer 30 in the form of encrypted files. For example, the installer starts when the user causes the occurrence of a starting event, as by selecting an encrypted file with the mouse pointer and double-clicking on this file or the like (S21).

The installer judges whether or not the old edition of the game program 40A that is to be updated has already been installed in the user computer 30 (S22). In cases where the old edition of the game program 40A has not been installed, for example, a warning message such as "OLD EDITION OF GAME HAS NOT BEEN INSTALLED. PROCESSING WILL BE ENDED." or the like is displayed on the screen, and the processing is ended (S23).

In cases where the old edition of the gram program 40A has been installed in the user computer (S22: YES), a judgment is made as to whether or not the new edition of the game program 40 and the execution control program 50 are to be newly installed (S24). In cases where the new edition of the game program 40 and the execution control program 50 have been installed in the past, the view may be taken that user registration and fee processing have already been completed. Accordingly, as a result, it is judged in S24 whether or not user registration and fee processing have already been completed.

In the case of installation for the first time, the function of the web browser 31 is called up and connected to the verification computer 20, and the user is caused to perform user registration and fee processing (S25, S26).

Next, the installer ascertains the registry of the execution control program 50, and in cases where the execution control program 50 has not yet been installed, the installer installs the execution control program 50 (S27). In order to rewrite the old edition of the game program 40A as the new edition of the game program 40, the installer rewrites the old editions of the program proper 41 and accompanying data group 42 as the new editions of the program proper 41 and accompanying data group 42 (S28, S29). Then, the installer starts the execution control program 50 and ends the processing (S30).

Figure 6:
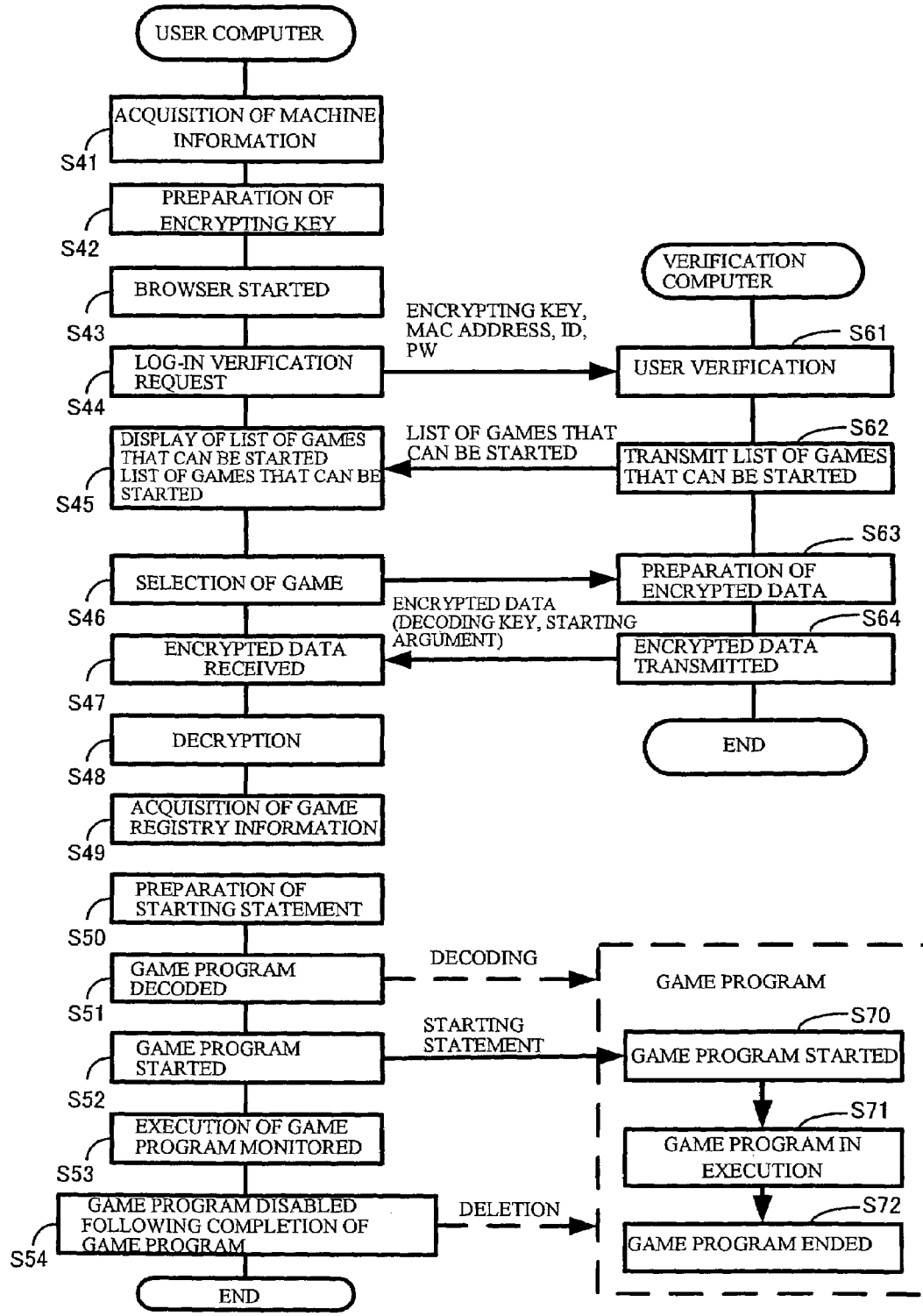
FIG. 6 is a flow chart showing the on-line verification and the like performed between the execution control program and the verification computer.

FIG. 6 is a flow chart showing the execution control processing performed by the execution control program 50, the processing of the verification computer 20 and the like.

The started execution control program 50 acquires machine information that is specific to the user computer 30 (in concrete terms, the MAC address) (S41). Furthermore, the execution control program 50 acquires current time information from an internal timer in the user computer 30, and creates an encrypting key on the basis of this time information (S42).

Next, the execution control program 50 calls up the function of the web browser 31 (S43), makes a connection with the verification computer 20 via the communications network, and requests log-in verification from the verification computer 20 (S44). The execution control program 50 transmits the user ID, password, MAC address and encrypting key to the verification computer 20 (S44). The verification computer 20 refers to the user information data base 24, and judges whether or not the user is a valid user (S61).

In cases where it is confirmed that the user is a valid user, the verification computer 20 creates list data listing the game programs that can be utilized by the user, and transmits this data to the user computer 30 (S62). Typically, game programs that have been purchased by the user may be cited as examples of game programs that can be utilized by the user. However, utilizable programs are not limited to such purchased programs; for example, game programs that are provided free of charge by software firms may also be included in such utilizable game programs.

When the execution control program 50 receives the list data of utilizable game programs from the verification computer 20, the execution control program 50 causes a list of games to be displayed on the monitor display of the user computer 30 (S45). The user selects the game that he wishes to play on the basis of this list menu (S46).

The verification computer 20 refers to the game information data base 25, creates starting information that is required in order to start the game program selected by the user, and encrypts this starting information by means of the encrypting key, MAC address and the like acquired in S61 (S63). The verification computer 20 transmits the encrypted starting information to the execution control program 50 of the user computer 30 (S64).

When the execution control program 50 receives the encrypted starting information from the verification computer 20 (S47), the execution control program 50 decrypts this encrypted starting information by means of the encrypting key and the MAC address (S48).

Next, the execution control program 50 acquires registry information for the new edition of the game program 40 (S49), and creates a starting statement by means of the registry path and starting argument (S50).

Furthermore, the execution control program 50 decodes the encrypted new edition of the game program 40 by means of the decoding key extracted from the starting information, and develops this into a specified directory of a specified drive (S51). As a result, the game program 40 is decoded and placed in a state waiting for starting.

Then, the execution control program 50 starts the decoded new edition of the game program 40 by means of the starting statement created in S50 (S52, S70). As a result, the user can play the new edition of the game program 40 (S71).

The execution control program 50 monitors the conditions of execution of the game program 40 (S53), and when the user finishes the game and ends the game program 40 (S72), the execution control program 50 disables the game program 40 by deleting the decoded program proper 41, and ends the processing (S54).

Furthermore, in cases where the user again desires to play using the game program 40, the user need merely access the verification computer 20 again, undergo on-line verification, and acquire starting information.

In the present embodiment constructed as described above, illegal use in which the use right is not purchased can be prevented even in the case of the distribution of downloading type software in which a program is stored in the user computer 30.

Specifically, in the present embodiment, in order to start the game program 40, it is necessary to perform on-line verification via the execution control program 50, and to obtain driving information from the verification computer 20 via the communications network, each time that the game program 40 is used. Accordingly, even if the game program 40 alone is illegally copied by itself, this illegally copied game program cannot be started by itself.

Furthermore, the execution control program 50 is constructed as a program that is close to the OS side, as in a device driver, and therefore cannot be closed by ordinary methods as in the case of a device driver. Accordingly, the system is devised so that the execution control program 50 and gram program 40 cannot be separated and the game program 40 alone illegally copied or taken out.

The present invention can be used in various types of businesses. For example, by updating the old editions of game programs that were illegally copied and circulated in the past, it is possible to force illegal users to acquire use rights in a formal manner, thus converting such users into valid users. In order to cause illegal users to switch to new editions of game programs, it would be possible to stimulate the desire of such users to update by preparing accompanying data groups (game scenarios, music or the like) corresponding the users' native languages, or by newly preparing additional scenarios or the like.

Next, another embodiment will be described with reference to FIGS. 7 through 12. In the present embodiment, a case in which a game program is fixed to a storage medium and circulated will be described as an example. In the present embodiment, the description given in the abovementioned embodiment can be appropriately applied as long as this description does not restrict the scope of the present invention. In the present embodiment as in the abovementioned embodiment, the execution of the game program is controlled by means of an execution control program (game manager in the present embodiment) as will be described later. In addition, in the present embodiment, on-line verification between the verification computer (DRM computer in the present embodiment) and the execution control program can be performed periodically.

Figure 7:
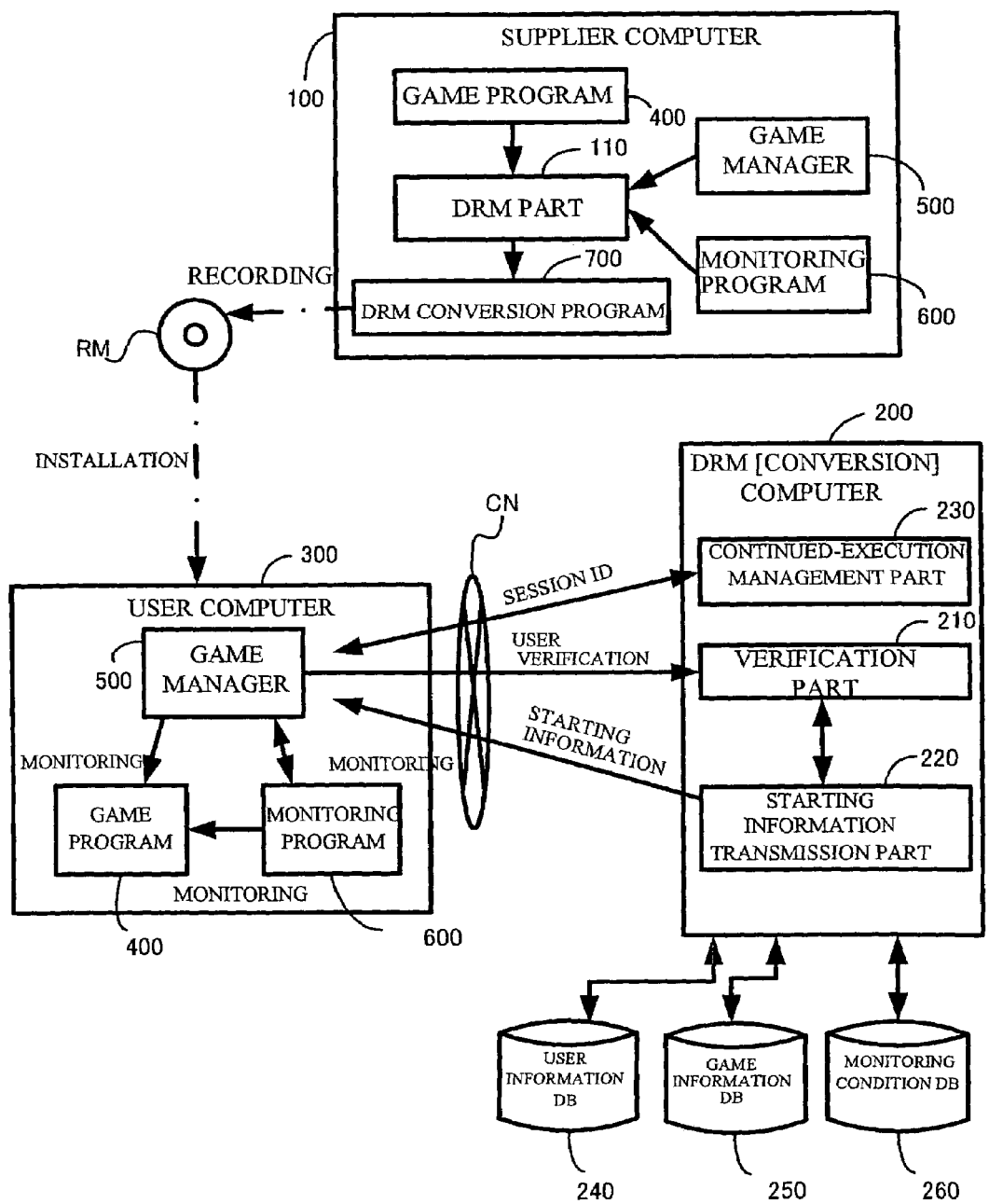
FIG. 7 is an explanatory diagram showing an overall outline of a software execution control system constituting an embodiment of the present invention.

FIG. 7 is an explanatory diagram which shows an overall outline of the software execution control system of the present embodiment. For example, as will be respectively described later, the present system can be constructed so that this system includes a supplier computer 100, a DRM conversion computer 200, and a user computer 300.

For instance, the supplier computer 100 is used by a software vendor who produces program products. The supplier computer 100 comprises a DRM part 110 that processes the game program 400 and converts this program into a DRM program 700. Here, "DRM" is an abbreviation for "digital rights management", and refers to the management of rights to the digitized contents of programs such as game programs or the like. In the present specification, "DRM conversion" refers to a process whereby resistance to improper use and the like is improved by setting individual protection (described later) for non-protected game programs.

The DRM part 110 sets individual protection for the game program 400 by adding a game manager 500 and a monitoring program 600 to the game program 400. The protected game program 400 is taken as a DRM-converted program 700, and is recorded on a recording medium RM and circulated on the market. The game manager 500 and monitoring program 600 will be further described later.

Various types of media such as CD-ROMs, DVD-ROMs, optical disks, hard disks, flexible disks, semiconductor memories, magnetic tapes and the like can be appropriately used as the recording medium RM. The DRM-converted program 700 may be compressed and recorded on the recording medium RM, or the DRM-converted program 700 may be recorded on the recording medium RM without being compressed. Furthermore, the installer that is used to install the DRM-converted program 700 in the user computer 300 can also be stored on the recording medium RM.

The DRM conversion computer 200 is one example of a "management computer". For example, the DRM conversion computer 200 can also be called a "verification management server". A DRM conversion computer 200 may be provided for each software vendor, or a single DRM conversion computer 200 may be provided for a plurality of software vendors.

The DRM conversion computer 200 transmits user verification and starting information, and manages the continued execution, by performing communications with the game manager 500 that operates in the user computer 300. The DRM conversion computer 200 comprises a verification part 210, an operating information transmission part 220, and a continued-execution management part 230.

Furthermore, the DRM conversion computer 200 can utilize the user information data base 240, game information data base 250, and monitoring condition data base 260. Moreover, the DRM conversion computer 200 need not be physically constructed from a single computer; this computer may also be realized by the cooperative operation of a plurality of computers.

Like the verification part 21 of the abovementioned embodiment, the verification part 210 performs user verification on the basis of verification data that is transmitted from the game manager 500 such as (for example) the user ID and password (shown as "PW" in the figures). Furthermore, like the starting information transmission part 23 in the abovementioned embodiment, the starting information transmission part 220 transmits to the game manager 500 (for example) information that is required for the game manager 500 to decode the game program 400 and place this game program 400 in a state that allows starting.

The continued-execution management part 230 manages whether or not the execution of the game program 400 is continued by performing communications with the game manager 500 at specified times. Details will be further described later; however, the continued-execution management part 230 compares a session ID that is transmitted from the game manager 500 with a session ID that is stored beforehand, and allows continuation of the execution of the game program 400 in cases where both IDs agree. Conversely, in cases where the two session IDs do not agree, the continued execution processing 230 instructs the game manager 500 to forcibly end the game program 400.

Like the user computer 3 of the abovementioned embodiment, the user computer 300 can be constructed as a personal computer, portable information terminal or portable telephone. The user computer 300 may comprise hardware resources and software resources as required, such as a CPU, memory, auxiliary storage device, OS, various types of device drivers and the like. The game program 400, game manager 500 and monitoring program 600 can appropriately utilize hardware resources and software resources of the user computer 300.

The game program 400, game manager 500 and monitoring program 600 are respectively performed in the user computer 300 by reading the stored contents of the recording medium RM into the user computer 300 and performing specified installation processing. For a user with proper authorization, the game manager 500 acts as a launcher program for starting the game program 400. However, the game manager 500 is not a simple launcher program, but controls the operation of the game program 400. Furthermore, the game manager 500 respectively monitors the operating conditions of the game program 400 and monitoring program 600, and in cases where either of the objects of monitoring ceases operation, the game manager 500 shuts down the operation of the other object of monitoring, and shuts down its own operation.

The monitoring program 600 respectively monitors the operating conditions of the game program 400 and the game manager 500, and in cases where either of these objects of monitoring ceases to operate, the monitoring program 600 shuts down the operation of the other object of monitoring, and shuts down its own operation. A valid user can use the game program 400 without being aware of the existence of the monitoring program 600.

FIG. 8 is an explanatory diagram showing one example of the respective data bases 240 through 260. As is shown in FIG. 8(*a*), for example, the user information data base 240 can associated and manage the user ID, password, MAC address, session ID and other information. As will be described later, the session ID is information that is used to judge whether or not continued execution is permitted. Specifically, in order to prevent the game program 400 from being improperly performed using a user computer that is separate from the user computer 300 that was initially verified, the game manager 500 and DRM conversion computer 200 periodically perform communications. In this case, the session ID that is received from the game manager 500 is compared with the session ID that is registered in the user information data base 240, and continuation of the execution of the game program 400 is permitted only when these session IDs agree. Furthermore, as in the case of the user information data base 24 shown in FIG. 2(*a*), a plurality of MAC addresses may be associated with a single user ID.

As is shown in FIG. 8(*b*), the game information data base 250 can be managed by (for example) associating game IDs, game names, game information, decoding keys (activating keys), starting arguments and reporting modes. Here, the term "reporting mode" refers to information that sets the policy relating to periodic reporting to the DRM conversion computer from the game manager 500. For example, the reporting mode can be set by the provider (software vendor) of the game program 400.

Here, examples of reporting modes that can be used include a mode in which a report is made to the DRM conversion computer 200 only when the game program 400 is initially started, a mode in which a report is made to the DRM conversion computer 200 each time that the game program 400 is started, a mode in which a report is made to the DRM conversion computer 200 at as short a period as possible with priority given to the monitoring efficiency, and a mode in which a report is made to the DRM conversion computer 200 at a low frequency with consideration given to reducing the burden on the DRM conversion computer 200.

As is shown in FIG. 8(*c*), the monitoring condition data base can be managed by associating (for example) the user IDs of the respective users executing the game program 400, the reporting periods from the respective user computers 300, the next reporting time, the game IDs of the game programs 400 executed by the respective users, and the game starting times. As will be described later, the next reporting time is actively controlled on the basis of the burden conditions, reporting mode and the like of the DRM conversion computer 200.

Figure 9:
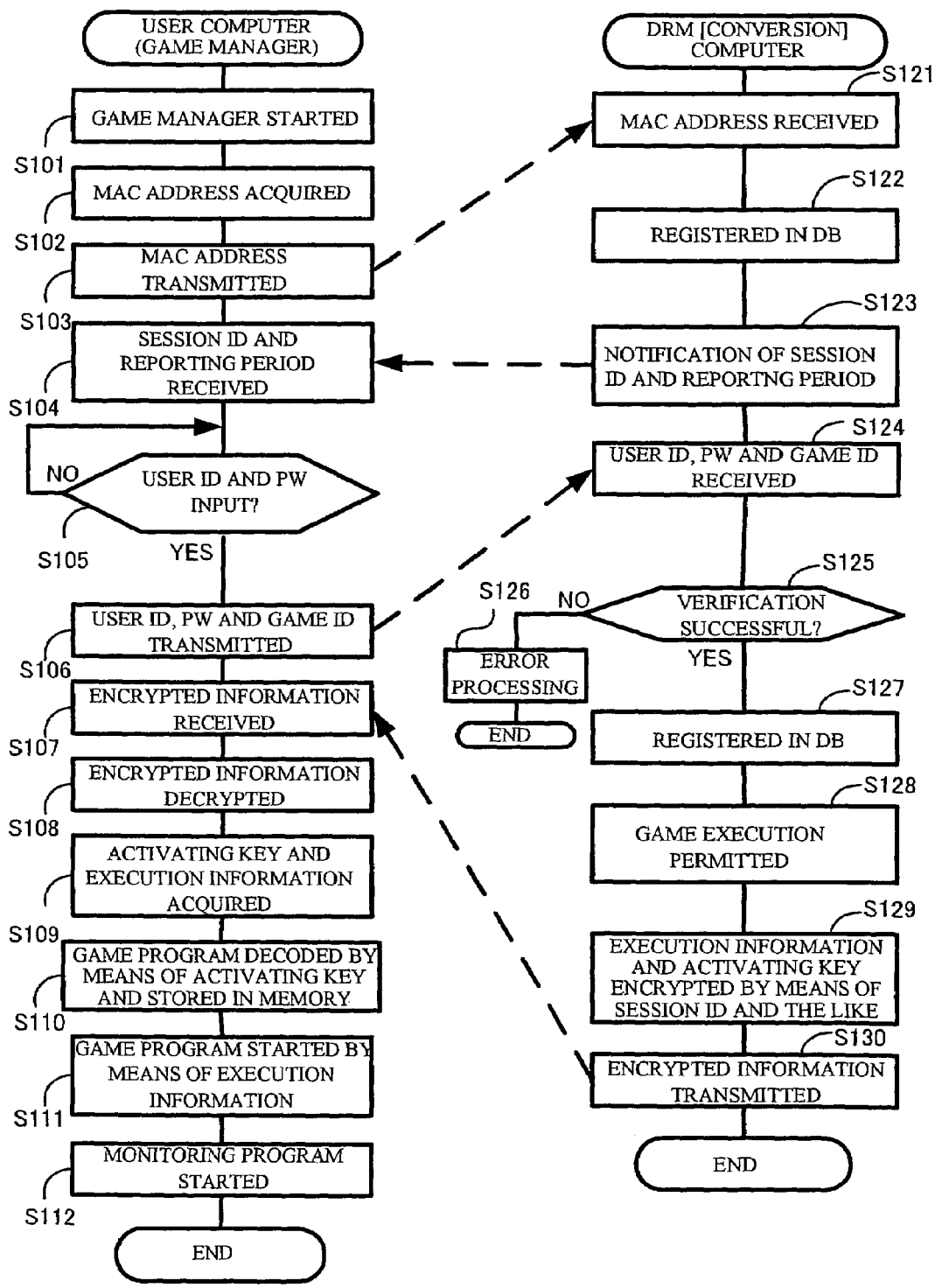
FIG. 9 is a flow chart showing an outline of the overall operation of the software execution control system.

Next, the operation of this system will be described with reference to FIGS. 9 through 12. First, FIG. 9 is a flow chart showing an outline of the operation that is performed when this system is started.

For example, the user desiring to utilize a game program 400 selects the game icon representing the desired game program 400, and gives instructions to start this game program 400. When the operation performed by this user is detected, the game manager 500 first starts (S101).

The game manager 500 acquires the MAC address which is one example of machine information that is specific to the user computer 300 (S102), and transmits this MAC address to the DRM conversion computer 200 via the communications network CN (S103).

The DRM conversion computer 200 registers the MAC address received from the game manager 500 in the user information data base 240 (S121, S122). At this point in time, only the MAC address has been ascertained; there is no association with the user ID or the like. Furthermore, it would also be possible to hold the MAC address in memory without registering this address in the user information data base 240, and then to register the MAC address in the user information data base 240 together with the user ID, session ID or the like in cases where user verification is successful.

The DRM conversion computer 200 issues a session ID, and further sets the reporting period. An initial value that is set beforehand can be used as the initially set reporting period. Then, the DRM conversion computer 200 notifies the game manager 500 of the session ID and initial reporting period (S123).

When the game manager 500 receives the session ID and reporting period (S104), the game manager 500 stores and holds these sets of information in the memory of the user computer 300. Next, the game manager 500 judges whether or not the user ID and password have been input (S105). For example, the user can be prompted to input such a user ID and password by displaying a screen that requests the input of this user ID and password when the user selects a game icon.

When the game manager 500 recognizes the input of a user ID and password (S105: YES), the game manager 500 transmits the input user ID and password, and the game ID of the game program 400 that the user wishes to execute, to the DRM conversion computer 200 (S106).

When the DRM conversion computer 200 receives the user ID, password and game ID from the game manager 500 (S124), the DRM conversion computer 200 refers to the user information data base 240, and performs user verification (S125). In cases where the user ID and password registered beforehand agree with the user ID and password received from the game manager 500 (S125: YES), user verification is successful. The DRM conversion computer 200 registers the user ID, password, MAC address and the like in association with each other in the user information data base 240 (S127). Conversely, in cases where either the user IDs or the passwords do not agree (S125: NO), user verification fails, and error processing is performed (S126). Conceivable error processing includes the display of a message such as "ID OR PASSWORD IS DIFFERENT" on the screen of the user computer 300. Furthermore, for example, in cases where user verification fails a specified number of times or more, the starting of the game program 400 can be locked. Moreover, user verification information is not limited to the user ID and password; for example, biological information such as voice, fingerprints, iris images or the like can also be used.

As a result of the success of user verification, the DRM conversion computer 200 determines that the game program 400 desired by the user can be executed (S128). The DRM conversion computer 200 creates and encrypts information that is used to allow the game manager 500 to start the game program 400 whose execution is permitted (S129). Examples of such game starting information include execution information such as file names or the like, activating keys and the like. For example, the DRM conversion computer 200 encrypts such execution information and activating keys using the session ID and user information (MAC addresses or the like), and transmits this encrypted information to the game manager 500 (S130).

When the game manager 500 receives encrypted information from the DRM conversion computer 200 (S107), the game manager 500 decrypts the encrypted information (S108), and acquires the activating key and execution information (S109). The encryption algorithm used by the DRM conversion computer 200 is known to the game manager 500, and the information required for decryption is also present on the side of the user computer 300; accordingly, the encrypted information can be decrypted.

The game manager 500 decodes the game program 400 by means of the acquired activating key, and stores this decoded game program 400 in the memory of the user computer 300 (S110).

Specifically, in cases where the game program 400 is installed in the user computer 300, the game program, for example, is recorded in an encoded state in the auxiliary storage device of the user computer 300. In this encoded state, the game program 400 cannot be started. The game program 400 can be started at the point in time at which the game manager 500 has acquired the activating key from the DRM conversion computer 200, decoded the game program 400, and stored this game program in the memory of the user computer 300. Here, it should be noted that the decoded game program 400 (program that is to be executed) is not stored as a file, but is present only in the memory. Since programs in the memory are deleted at the time that the game program 400 is completed, it is necessary to acquire user verification and an activating key again via the game manager 500 in cases where the game is to be played again.

Furthermore, the game manager 500 starts the game program 400 placed in the memory of the user computer 300 on the basis of the execution information (S111). As a result, the user can execute and play the game program 400. Furthermore, at the same time that the game program 400 is started (this need not be simultaneous in a strict physical sense), the game manager 500 also starts the monitoring program 600 (S112). The operation of the monitoring program 600 will be further described later.

Figure 10:
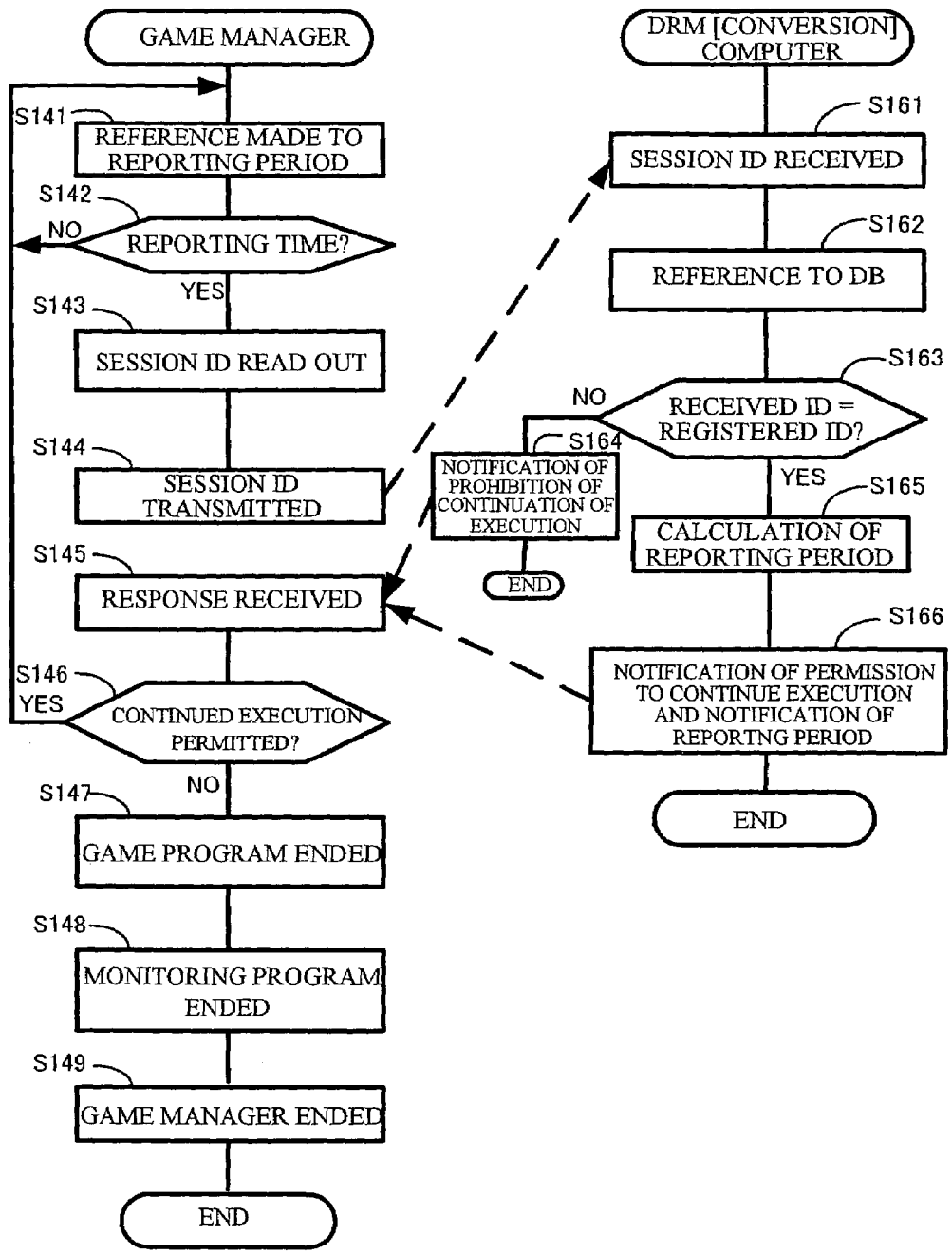
FIG. 10 is a flow chart showing an outline of the processing of the periodically performed continuation confirmation communications.

Next, the processing for controlling the continuation of the execution of the game program 400 will be described with reference to FIG. 10.

The game manager 500 refers to the reporting period that is set by the DRM conversion computer 200 at the time of starting (S141). By utilizing a timer function or the like of the user computer 300, the game manager 500 judges whether or not the reporting time preset by the DRM conversion computer 200 has arrived (S142).

In cases where the reporting time has arrived (S142: YES), the game manager 500 reads out the session ID set by the DRM conversion computer 200 from the memory of the user computer 300 (S143), and transmits this read-out session ID to the DRM conversion computer 200 (S144).

When the DRM conversion computer 200 receives the session ID from the game manager 500 (S161), the DRM conversion computer 200 refers to the user information data base 240. The DRM conversion computer 200 compares the issued session ID registered in the user information data base 240 with the session ID received from the game manager 500, and judges whether or not the two IDs agree (S163). Furthermore, the game manager 500 may transmit only the session ID to the DRM conversion computer 200, or may include all or part of the user information such as the user ID and the like in addition to the session ID. Furthermore, environmental information relating to the user computer 300 (CPU utilization rate, amount of memory consumption or the like) may also be included. However, as the amount of information added to the session ID increases, the burden on the user computer 300 also increases, as does the network traffic.

In cases where the session ID received from the game manager 500 does not agree with the session ID registered beforehand (S163: NO), the DRM conversion computer 200 (continued-execution management part 230) notifies the game manager 500 that continuation of the execution of the game program 400 is prohibited (S164). Cases in which the two session IDs do not agree are cases in which the game program 400 is executed using a different user computer or the like, i.e., cases in which the same game program 400 is started a plurality of times using one user ID. Accordingly, in cases where the two session IDs do not agree, the game manager 500 is instructed to end the game program 400 forcibly.

In cases where the session ID received from the game manager 500 agrees with the session ID registered beforehand (S163: YES), the DRM conversion computer 200 calculates a new reporting period, i.e., the next reporting time (S165). The calculation of this new reporting period will be further described later; however, this is determined with the load conditions of the DRM conversion computer 200 and the like being taken into account.

In cases where both session IDs agree, the DRM conversion computer 200 notifies the game manager 500 of the newly calculated reporting period and the permission to continue execution (S166).

The game manager 500 receives a response from the DRM conversion computer 200 regarding the possibility of continuing execution (S145). In cases where continuation of the execution of the game program 400 is permitted (S146: YES), the newly set reporting period is stored in the memory of the user computer 300, and the processing returns to S141 and waits for the arrival of the reporting time.

Conversely, in cases where the continuation of execution is prohibited by the DRM conversion computer 200 (S146: NO), the fm 500 forcibly ends the game program 400 that is in execution (S147). Furthermore, after ending the monitoring program 600 (S148), the game manager 500 also shuts itself down (S149).

Thus, the game manager 500 periodically performs a simple verification with the DRM conversion computer 200. As a result, for example, improper utilization in which a plurality of game programs 400 are started using the same user ID and password can be prevented.

Figure 11:
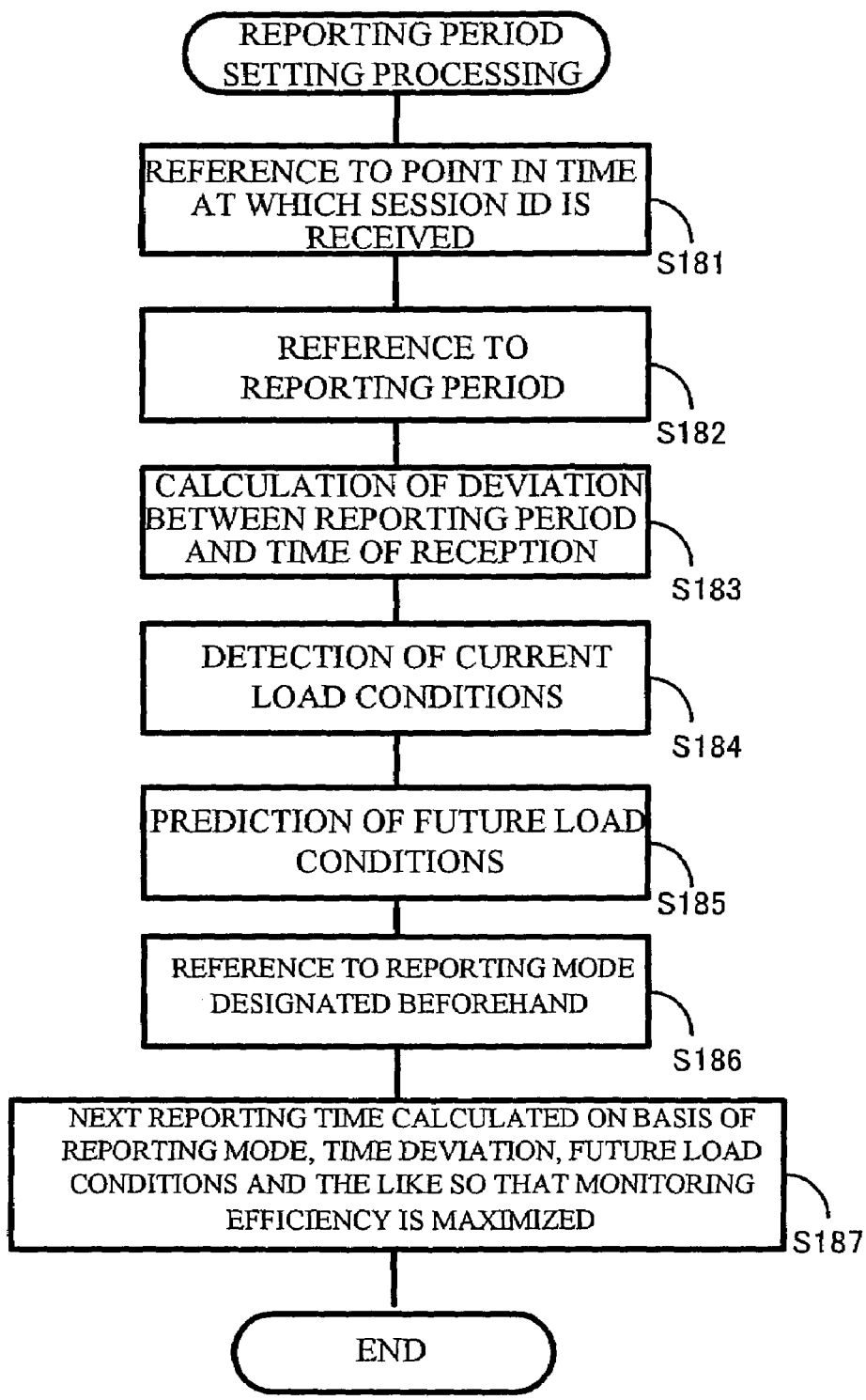
FIG. 11 is a flow chart showing an outline of the processing that determines the time at which the next continuation confirmation communications are to be performed.

FIG. 11 is a flow chart showing the setting processing of the reporting period. This is one example of the concrete realization of the contents of S165 in FIG. 10. The DRM conversion computer 200 (more specifically, the continued-execution management part 230) refers to the point in time at which the session ID is received from the game manager 500 (S181). Next, the game manager 500 refers to the reporting period that is associated with the reception of this session ID (S182).

The game manager 500 calculates the deviation between the point in time at which the session ID is received and the preset reporting period. For example, in cases where the point in time of actual session ID reception is later than the planned point in time of session ID reception, possible causes of this include delay of packet arrival due to complexity of the communications network CN, a drop in the response performance due to an increase in the burden on the DRM conversion computer 200 and the like.

The DRM conversion computer 200 detects its own current load conditions (S184). Examples of such load conditions include the number of users currently playing, i.e., the number of game managers that are to be subjected to periodic verification processing on-line and the like. In addition to this, for example, the CPU utilization rate, amount of memory consumption, data input-output processing rate (I/O rate) and the like may also be detected.

The DRM conversion computer 200 predicts future load conditions on the basis of the current load conditions (S185). Specifically, in cases where the reporting period of the game manager 500 is maintained at the current value, the load conditions of the DRM conversion computer 200 at the next reporting time are predicted. In concrete terms, for example, in a case where the current reporting period is set at "1 hour", the number of users (number of game managers) undergoing on-line verification after 1 hour has elapsed from the current point in time can be grasped by means of the monitoring condition data base 260.

Next, the DRM conversion computer 200 refers to the reporting mode that is set beforehand for the game program 400 in execution (S186). The reporting mode associated with the game program 400 can be altered even after the recording medium RM is circulated on the market. For example, the DRM conversion computer 200 can be notified of the game ID and new reporting mode by the supplier computer 100, and alteration of the game information data base 250 can be requested.

Finally, for example, the DRM conversion computer 200 calculates the new reporting period on the basis of the reporting mode, amount of time deviation between the planned point in time of the session ID reception and actual point in time of this reception, and future predicted load conditions so that the monitoring efficiency is maximized (S187).

For example, when a newly created popular game program is first placed on the market, the number of users of this game program increases abruptly. Accordingly, the burden on the DRM conversion computer 200 which performs a simple periodic verification on-line shows an increase. Security against improper use is improved as the reporting period is set as a shorter period; on the other hand, however, the burden on the DRM conversion computer 200 is also increased. If the reporting period is set as too short a period because of the emphasis on security, the response characteristics of the DRM conversion computer 200 deteriorate, and there is a possibility that this will lead to a shutdown of the function. Accordingly, in cases where there is a temporary increase in the load, as in the initial marketing of a newly created popular game or the like, the system is controlled so that the reporting period is lengthened.

Thus, for example, in the case of monitoring priority mode, the DRM conversion computer 200 can set the reporting period (monitoring timing) so that maximum security can be obtained within limits that do not cause a shutdown of the function. On the other hand, in the case of load reduction mode, the DRM conversion computer 200 can set the reporting period at a period that makes it possible to maintain at least minimum security.

The above is one example; various algorithms can be introduced for the prediction of the load conditions, setting of the reporting period and the like.

Figure 12:
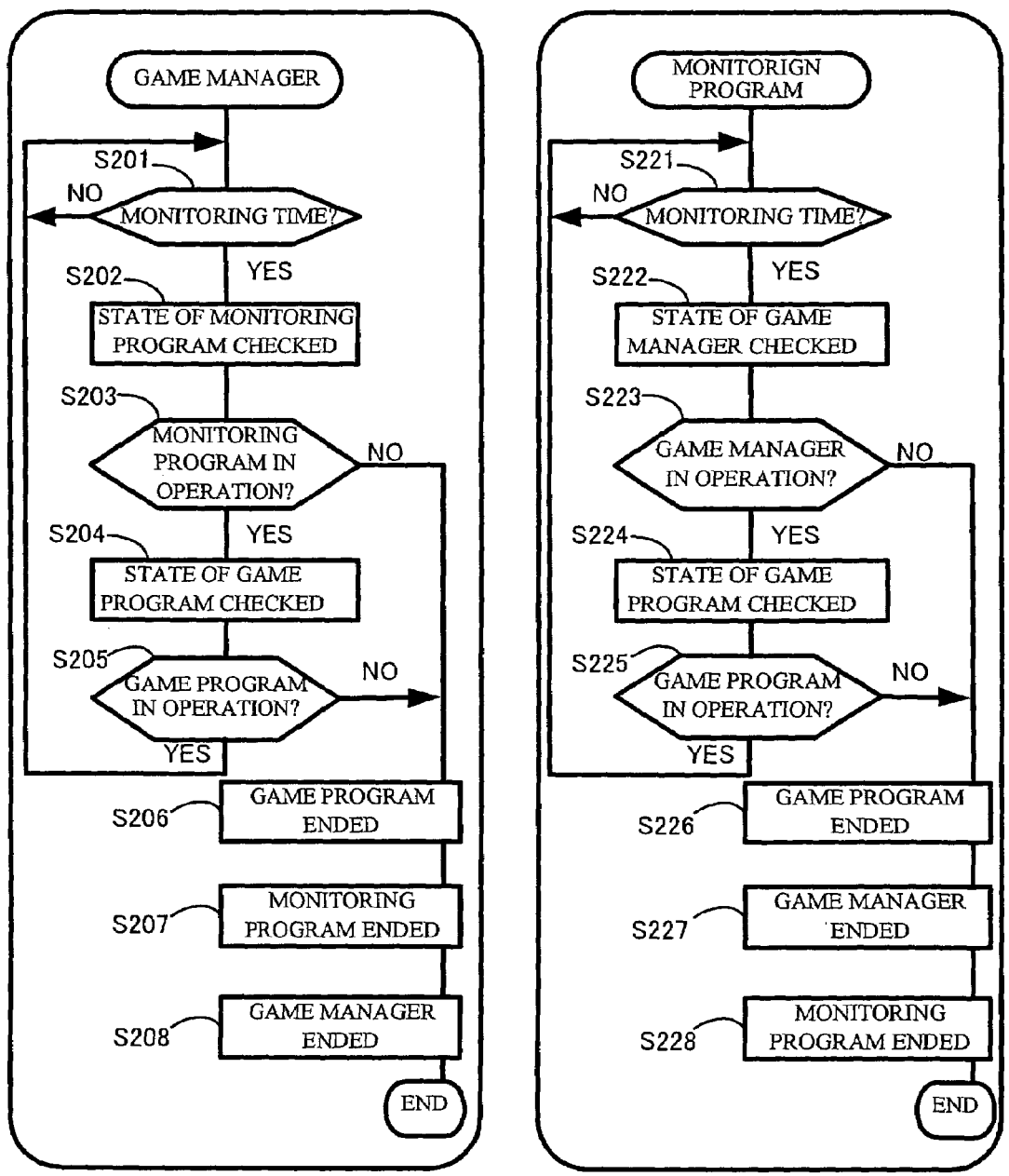
FIG. 12 is a flow chart showing an outline of the processing whereby the game manager and monitoring program monitor each other.

Next, FIG. 12 is a flow chart which shows the mutual monitoring processing performed by the game manager 500 and monitoring program 600. In this embodiment, the game manager 500 and monitoring program 600 respectively monitor the operating conditions of the game program 400 as a shared object of monitoring; in addition, these parts also periodically monitor each other as objects of monitoring. If periodic on-line verification between the DRM conversion computer 200 and game manager 500 is taken as monitoring from the outside, then the mutual monitoring of the game manager 500 and monitoring program 600 can be positioned as internal monitoring.

To describe the monitoring processing of the game manager 500 first, the game manager 500 judges whether or not the preset monitoring time has arrived (S201). It is desirable to set the monitoring time with a relatively short period. When the monitoring time arrives (S201: YES), the game manager 500 checks the operating conditions of the monitoring program 600 (S203), and judges whether or not the monitoring program 600 is operating normally (S203).

In cases where the monitoring program 600 is operating normally (S203: YES), the game manager 500 next checks the operating conditions of the game program 400 (S204), and judges whether or not the game program 400 is operating normally (S205). In cases where the game program 400 is also operating normally (S205: YES), the game manager 500 waits until the next monitoring time arrives (S201).

On the other hand, in cases where the monitoring program 600 has stopped operating (S203: NO), or in cases where the game program 400 has stopped operating (S205: NO), the game manager 500 shifts to forcible stop processing (S206 through S208).

Specifically, after the game manager 500 stops the operation of both the game program 400 and the monitoring program 600 (S206, S207), the game manager 500 also shuts itself down (S208). In cases where the operation of the game program 400 is stopped, the decoded game program 400 is immediately deleted from the memory of the user computer 300 and destroyed.

Furthermore, in the case of programs that have already stopped, there is no need to order stopping again. For example, in a case where stopping of the operation of the game program 400 has been confirmed, and the processing has shifted to forcible stop processing, there is no need to order the stopping of the operation of the game program 400 again. Similarly, in a case where the stopping of the operation of the monitoring program 600 has been confirmed, and the processing has shifted to forcible stop processing, there is no need to order the stopping of the operation of the monitoring program 600 again. However, stopping of the operation of both the game program 400 and monitoring program 600 may be order to ensure stopping.

The same is true of the processing of the monitoring program 600. When the monitoring time arrives (S221: YES), the monitoring program 600 respectively monitors the operating conditions of the game manager 500 and game program 400 (S222 through S225), and in cases where either of these has stopped operating (S223: NO, or S225: NO), the monitoring program 600 shifts to forcible stop processing, and shuts down all of the programs (S226 through S228).

Thus, since a plurality of operating monitoring programs, i.e., the game manager 500 and monitoring program 600, monitor the operating conditions of the game program 400, and also monitor each other, the stopping of the operation of the game program 400 can be more reliably detected. Furthermore, even in cases where one of the operation monitoring programs is intentionally shut down, the other monitoring program can perform an overall shutdown, so that improper copying of the game program 400 opened in the memory of the user computer 300 can be prevented in advance.

In the present embodiment, as was described above in detail, periodic on-line verification is performed between the game manager 500 that controls the operation of the game program 400 and the DRM conversion computer 200 that performs license verification; accordingly, the durability against improper use can be increased.

Furthermore, since this periodic on-line verification is performed by comparing session IDs, this can be accomplished by relatively simple processing. Accordingly, a simple verification can be performed in a relatively short time without increasing the burden on the computers, and security can be maintained over a long period of time.

In addition, the timing at which this simple on-line verification is performed (i.e., the reporting period) is actively controlled on the basis of the load conditions of the DRM conversion computer 200 and the like; accordingly, higher security can be realized while taking into account the network traffic, computer load and the like.

Moreover, a construction is used in which two respectively independent operation monitoring programs, i.e., the game manager 500 and monitoring program 600, are prepared, and these programs can monitor not only the operating conditions of the game program 400, but also each other, so that in cases where even one of the programs, i.e., the game program 400, game manager 500 or monitoring program 600, stops operating, the operation of the other two programs can also be stopped, and the game program 400 can be disabled by being deleted or the like; accordingly, actions such as the improper read-out and copying of the game program 400 opened in the memory can be prevented, and reliability can be further heightened.

Figure 13:
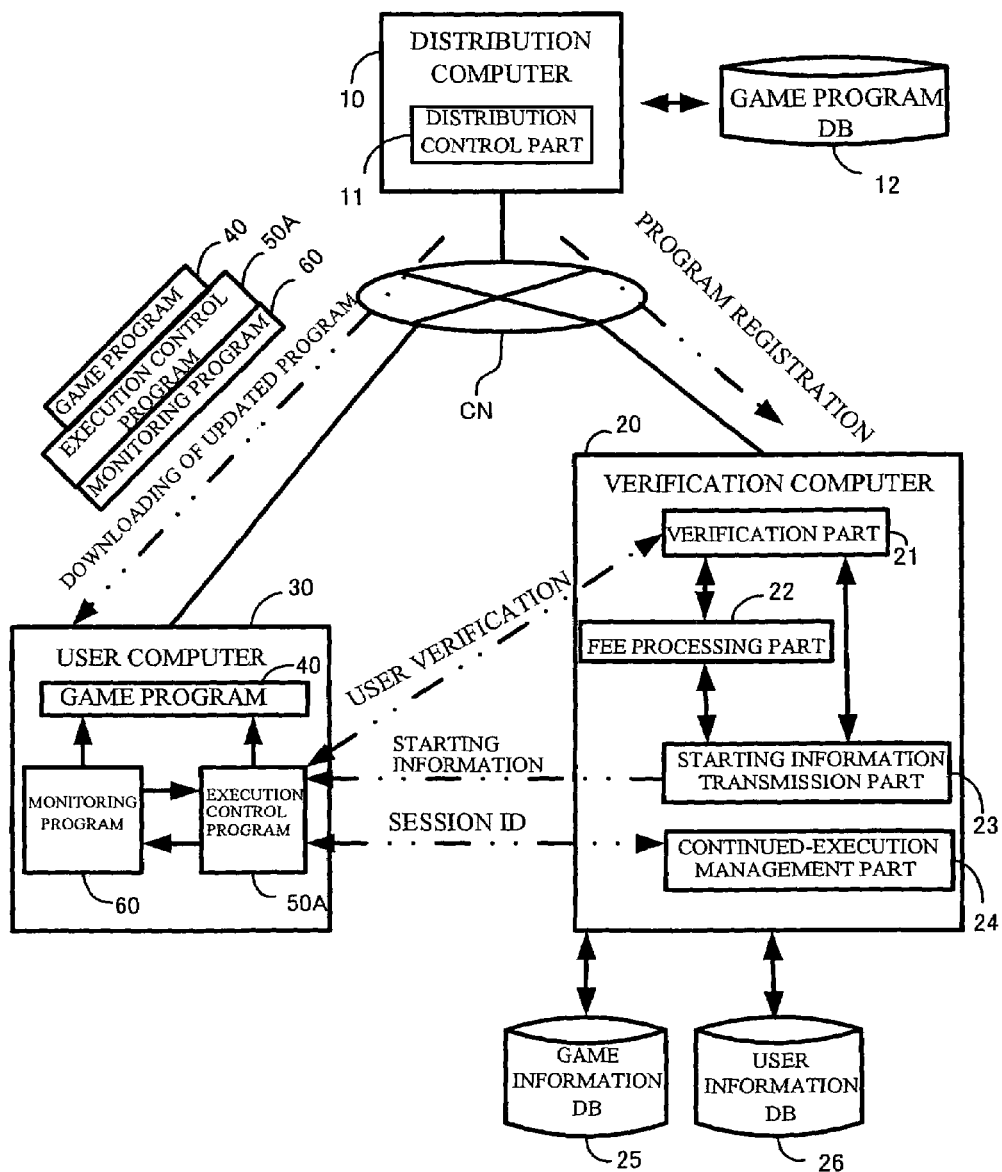
FIG. 13 is an explanatory diagram showing an overall outline of a software execution control system constituting still another embodiment of the present invention.

Next, FIG. 13 shows still another embodiment of the present invention. This embodiment has a construction in which mutual monitoring by a plurality of monitoring programs and periodic on-line verification with a verification computer are realized in the first embodiment.

In this embodiment, a game program 40, execution control program 50A and monitoring program 60 are distributed to a user computer 30 from a distribution computer 10.

In addition to the construction and effects of the abovementioned execution control program 50, the execution control program 50A comprises an easy periodic on-line verification function and a monitoring function that are performed by the abovementioned game manager 500. Furthermore, the monitoring program 60 comprises a monitoring function similar to that of the abovementioned monitoring program 600.

The execution control program 50A performs decoding of the game program 40 and the like by means of an initial user verification. Furthermore, the execution control program 50A also performs user verification during the execution of the game program 40 by periodically transmitting a session ID to the to the verification computer 20. In cases where the user verification is successful, the execution control program 50A permits continuous execution of the game program 40, while in cases where the user verification fails, the execution control program 50A forcibly ends the game program 40.

Furthermore, the execution control program 50A and monitoring program 60 both monitor the starting conditions of the game program 40, and also respectively monitor each other. Moreover, in cases where even one of the programs, i.e., the game program 40, execution control program 50A or monitoring program 60, ends, the execution control program 50A or monitoring program 60 detects this, and shuts down the remaining programs and itself.

Furthermore, the respective embodiments of the present invention described above are examples used to describe the present invention; the scope of the present invention is not limited to these embodiments alone. A person skilled in the art can work the present invention in various aspects without departing from the spirit of the present invention.

The invention claimed is:

1. A method for installing software, verifying installation of software and executing software in a computer, wherein the method comprises:

receiving encoded software and an execution control program;

executing the execution control program to provide user data that identifies the computer or a user of the computer to a verification server, the verification server comparing the user data to information stored in a database to verify the user data and, if the user data is verified, providing decoding information and starting information to the computer, wherein the decoding information allows encoded software to be decoded and installed in the computer, and the starting information allows the installed decoded software to execute in the computer;

executing the execution control program to decode the encoded software in response to the decoding information to obtain decoded software and installing the decoded software;

starting execution of the installed decoded software using the starting information, wherein the installed decoded software will not execute without the starting information;

providing the user data or session data that identifies the computer or the user of the computer to the verification server one or more times during the execution of the installed decoded software;

the verification server comparing the user data or the session data to information stored in the database to verify the user data or the session data during the execution of the installed decoded software; and ending the execution of the installed decoded software in response to the verification server failing to verify the user data or the session data during the execution installed software.

2. The method of claim 1 that comprises:

receiving a monitoring program from the verification server; and executing the monitoring program;

wherein the execution of the monitoring program comprises:

monitoring executions of the installed decoded software and the execution control program; and if one of the executions of the installed decoded software or the execution control program ends, ending the other of the executions of the installed decoded software and the execution control program;

and wherein the execution of the execution control program further comprises:

monitoring the executions of the installed decoded software and the monitoring program; and if one of the executions of the installed decoded software and the monitoring program ends, ending the other of the executions of the installed decoded software and the monitoring program.

3. The method of claim 1 that comprises disabling execution of the installed decoded software when its execution is completed.

4. The method of claim 3 that disables execution of the installed decoded software by deleting at least a portion of the installed decoded software.

5. The method of claim 3, wherein the starting and the disabling execution of the installed decoded software is performed by the execution control program.

6. The method of claim 1 that comprises:
determining a reporting period according to a load condition of a verification server; and
instructing the computer to send the user data or the session data to the verification server in each reporting period during the execution of the installed decoded software.

7. A storage medium recording a program of instructions that is executable by a machine to perform a method for installing software, verifying installation of software and executing software in a computer, wherein the method comprises:
receiving encoded software and an execution control program;
executing the execution control program to provide user data that identifies the computer or a user of the computer to a verification server,
the verification server comparing the user data to information stored in a database to verify the user data and, if the user data is verified, providing decoding information and starting information to the computer, wherein the decoding information allows encoded software to be decoded and installed in the computer, and the starting information allows the installed decoded software to execute in the computer;
executing the execution control program to decode the encoded software in response to the decoding information to obtain decoded software and installing the decoded software; and
starting execution of the installed decoded software using the starting information, wherein the installed decoded software will not execute without the starting information;
providing the user data or session data that identifies the computer or the user of the computer to the verification server one or more times during the execution of the installed decoded software; and
the verification server comparing the user data or the session data to information stored in the database to verify the user data or the session data during the execution of the installed decoded software; and
ending the execution of the installed decoded software in response to the verification server failing to verify the user data or the session data during the execution installed software.

8. The medium of claim 7, wherein the method comprises:
receiving a monitoring program from the verification server; and
executing the monitoring program;
wherein the execution of the monitoring program comprises:
monitoring executions of the installed decoded software and the execution control program; and
if one of the executions of the installed decoded software or the execution control program ends, ending the other of the executions of the installed decoded software and the execution control program;
and wherein the execution of the execution control program further comprises:
monitoring the executions of the installed decoded software and the monitoring program; and
if one of the executions of the installed decoded software and the monitoring program ends, ending the other of the executions of the installed decoded software and the monitoring program.

9. The medium of claim 7, wherein the method comprises disabling execution of the installed decoded software when its execution is completed.

10. The medium of claim 9, wherein the method disables execution of the installed decoded software by deleting at least a portion of the installed decoded software.

11. The medium of claim 9, wherein the starting and the disabling execution of the installed decoded software is performed by the execution control program.

12. The medium of claim 7, wherein the method comprises:
determining a reporting period according to a load condition of a verification server; and
instructing the computer to send the user data or the session data to the verification server in each reporting period during the execution of the installed decoded software.

13. A computer system comprising a first computer and a second computer for installing software, verifying installation of software and executing software in the first computer, wherein the first computer comprises:
a first calculation processing unit;
first memory;
first input-output circuits;
one or more first storage devices; and
first circuitry that couples the first calculation processing unit, the first memory, the first input-output circuits and the one or more first storage devices;
wherein the one or more first storage devices record encoded software and an execution control program, the first memory records programs including at least a portion of the execution control program for execution by the first calculation processing unit to:
send user data through the first input-output circuits that identifies the first computer or a user of the first computer to the second computer,
receive through the first input-output circuits decoding information and starting information from the second computer;
decode the encoded software in response to the decoding information to obtain decoded software and install the decoded software;
start execution of the installed decoded software using the starting information, wherein the installed decoded software will not execute without the starting information;
send the user data or session data that identifies the first computer or the user of the first computer through the first input-output circuits to the second computer one or more times during the execution of the installed decoded software; and
end the execution of the installed decoded software in response to the second computer failing to verify the execution of the installed decoded software;
wherein the second computer comprises:
a second calculation processing unit;
second memory;
second external input-output circuits;
one or more second storage devices storing a database; and
second circuitry that couples the second calculation processing unit, the second memory, the second external input-output circuits and the one or more second storage devices; and
wherein the second memory records programs for execution by the second calculation processing unit to:
receive user data through the second external input-output circuits that identifies the first computer or a user of the first computer,
compare the user data to information stored in the database to verify the user data;

if the user data is verified, send decoding information and starting information to the first computer through the second external input-out circuits,
wherein the decoding information allows encoded software to be decoded and installed in the first computer, and the starting information allows the installed decoded software to execute in the first computer:
  receive the user data or session data from the first computer one or more times through the external input-output circuits during the execution of the installed decoded software;
  compare the user data or the session data to information stored in the database to verify the user data or the session data during the execution of the installed decoded software; and
  prohibit the first computer from continuing the execution of the installed decoded software if verifying the user data or the session data fails.

14. The computer system of claim 13, wherein the first memory records at least a portion of the execution control program for execution by the first calculation processing unit to:
  receive a monitoring program from the second computer; and
  execute the monitoring program;
    wherein execution of the monitoring program comprises:
      monitoring executions of the installed decoded software and the execution control program; and
      if one of the executions of the installed decoded software or the execution control program ends, ending the other of the executions of the installed decoded software and the execution control program;
    and wherein the execution of the execution control program further comprises:
      monitoring the executions of the installed decoded software and the monitoring program; and
      if one of the executions of the installed decoded software and the monitoring program ends, ending the other of the executions of the installed decoded software and the monitoring program.

15. The computer system of claim 13, wherein the first calculation processing unit disables execution of the installed decoded software when its execution is completed.

16. The computer system of claim 15, wherein the first calculation processing unit disables execution of the installed decoded software by deleting at least a portion of the installed decoded software.

17. The computer system of claim 15, wherein the first calculation processing unit starts and disables execution of the installed decoded software by executing the execution control program.

18. The computer system of claim 13, wherein the second memory records programs for execution by the second calculation processing unit to:
  determine a reporting period according to a load condition of the second computer; and
  instruct the first computer to send the user data or the session data in each reporting period during the execution of the installed decoded software.

19. A computer system for installing software, verifying installation of software and executing software in a computer, wherein the computer system comprises:
  means for receiving encoded software and an execution control program;
  means for providing user data that identifies the computer or a user of the computer to a verification server,
  means for comparing the user data to information stored in a database to verify the user data and, if the user data is verified, for providing decoding information and starting information to the computer, wherein the decoding information allows encoded software to be decoded and installed in the computer, and the starting information allows the installed decoded software to execute in the computer;
  means for decoding the encoded software in response to the decoding information to obtain decoded software and installing the decoded software;
  means for starting execution of the installed decoded software using the starting information, wherein the installed decoded software will not execute without the starting information;
  means for providing the user data or session data that identifies the computer or the user of the computer to the verification server one or more times during the execution of the installed decoded software;
  means for comparing the user data or the session data to information stored in the database to verify the user data or the session data during the execution of the installed decoded software; and
  means for ending the execution of the installed decoded software in response to the verification server failing to verify the user data or the session data during the execution installed software.

20. The computer system of claim 19 that comprises:
  means for receiving a monitoring program from the verification server; and
  means for executing the monitoring program;
    wherein execution of the monitoring program comprises:
      monitoring executions of the installed decoded software and the execution control program; and
      if one of the executions of the installed decoded software or the execution control program ends, ending the other of the executions of the installed decoded software and the execution control program;
    and wherein execution of the execution control program further comprises:
      monitoring the executions of the installed decoded software and the monitoring program; and
      if one of the executions of the installed decoded software and the monitoring program ends, ending the other of the executions of the installed decoded software and the monitoring program.

21. The computer system of claim 19 that comprises means for disabling execution of the installed decoded software when its execution is completed.

22. The computer system of claim 21 that disables execution of the installed decoded software by deleting at least a portion of the installed decoded software.

23. The computer system of claim 21, wherein the starting and the disabling execution of the installed decoded software is performed by the execution control program.

24. The computer system of claim 19 that comprises:
  means for determining a reporting period according to a load condition of a verification server; and
  means for instructing the computer to send the user data or the session data to the verification server in each reporting period during the execution of the installed decoded software.

* * * * *